(12) United States Patent
Pelly et al.

(10) Patent No.: US 7,085,395 B2
(45) Date of Patent: Aug. 1, 2006

(54) APPARATUS FOR DETECTING AND RECOVERING DATA

(75) Inventors: Jason Charles Pelly, Reading (GB); Stephen Mark Keating, Reading (GB); Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 650 days.

(21) Appl. No.: 10/007,085

(22) Filed: Dec. 6, 2001

(65) Prior Publication Data

US 2002/0131617 A1 Sep. 19, 2002

(30) Foreign Application Priority Data

Dec. 7, 2000 (GB) ................................. 0029859.6
Dec. 7, 2000 (GB) ................................. 0029867.9

(51) Int. Cl.
*G06K 9/00* (2006.01)
(52) U.S. Cl. ....................... 382/100; 713/176
(58) Field of Classification Search ................ 382/100; 713/176
See application file for complete search history.

(56) References Cited

U.S. PATENT DOCUMENTS

| | | | |
|---|---|---|---|
| 5,915,027 A * | 6/1999 | Cox et al. ..................... 380/54 |
| 5,930,369 A | 7/1999 | Cox et al. |
| 6,307,949 B1 * | 10/2001 | Rhoads ........................ 382/100 |
| 6,385,329 B1 * | 5/2002 | Sharma et al. ............... 382/100 |
| 6,421,463 B1 * | 7/2002 | Poggio et al. ............... 382/224 |
| 6,674,876 B1 * | 1/2004 | Hannigan et al. ........... 382/100 |
| 6,678,390 B1 * | 1/2004 | Honsinger ................... 382/100 |
| 6,757,405 B1 * | 6/2004 | Muratani et al. ........... 382/100 |

FOREIGN PATENT DOCUMENTS

| | | |
|---|---|---|
| EP | 0828372 | 3/1998 |
| EP | 0 840 513 A | 5/1998 |
| EP | 0951175 | 10/1999 |
| WO | WO 98/03014 | 1/1998 |

(Continued)

OTHER PUBLICATIONS

Sarwate D V et al: "Crosscorrelation Properties of Pseudo-random and Related Sequences" Proceedings of the IEEE, IEEE. New York, US, vol. 68, No. 5, May 1980, pp. 593-619, XP000857081 ISSN: 0018-9219 Section I., pp. 593-595 Section III.B., pp. 599-600.

(Continued)

*Primary Examiner*—Bhavesh M. Mehta
*Assistant Examiner*—Craig Kronenthal
(74) *Attorney, Agent, or Firm*—Oblon, Spivak, McClelland, Maier & Neustadt, P.C.

(57) ABSTRACT

An apparatus for detecting and recovering data embedded in information material, the data having been embedded in the material in a transform domain representation by arranging for the data to modulate a predetermined data sequence to form modulated data and combining the modulated data with the material. The apparatus includes a transform processor operable to transform the material into the transform domain representation, and a correlation processor operable to correlate transform domain data symbols bearing the modulated data with a reproduced version of the predetermined data sequence to form a correlation output signal and to recover the embedded data from the correlation output signal. The correlation processor is operable to repeat the correlation for transform domain data symbols and data symbols of the predetermined data sequence for each of a plurality of start positions in the transform domain.

41 Claims, 12 Drawing Sheets

FOREIGN PATENT DOCUMENTS

| | | |
|---|---|---|
| WO | WO 00/22772 | 4/2000 |
| WO | WO 00/26860 | 5/2000 |
| WO | WO 00/30291 | 5/2000 |
| WO | WO 00 56058 | 9/2000 |

OTHER PUBLICATIONS

Kalker T et al: A Video Watermarking System for Broadcast Monitoring: Proceedings of the SPIE, SPIE, Bellingham, VA, US vol. 3657, Jan. 25, 1999, pp. 103-112, XP000949142 ISSN: 0277-786X Sections 5., 6. and 8., pp. 107-111; figure 3.

T.H. Cormen, C.E. Leiserson, R.L. Rivest: "Introduction to Algorithms" 1989, MIT Press in Cooperation With McGraw Hill, Cambridge, Massachusetts, US, XP002318437 Section 1.3.1 "The divide-and-conquer approach", pp. 12-15, including the Exercises.

Paul Dunne: "Algorithm Design Paradigms-Divide-and-Conquer" 'Online! Oct. 9, 1999, XP002318436 Retrieved from the Internet: URL: http://web.archive.org/we/ 19991009060653/http://www.csc.liv.ac.uk/fped/ teachadmin/algoe/d_and_c.html> 'retrieved on Feb. 18, 2005! Section "Divide-and-Conquer" Example 1 "Binary Search".

Wilkinson J H et al: "Tools and Techniques for Globally Unique Content Identification" SMPTE Journal, SMPTE Inc. Scarsdale, N.Y. US, vol. 109, No. 10, Oct. 2000, pp. 795-799, XP000969315 ISSN: 0036-1682.

Kaewkamnerd N et al: "Wavelet Based Watermarking Detection Using Multiresolution Image Registration" Proceedings of the Region 10 Conference on Computer and Communication Systems (TENCON). Hong Kong, Sep. 24-27, 1990, New York, IEEE, US, vol. vol. 2, Sep. 24, 2000, pp. II 171-175, XP001066364.

Tirkel A Z et al: "Image and watermark registration" Signal Processing, Elsevier Science Publishers B.V. Amsterdam, NL, vol. 66, No. 3, May 28, 1998, pp. 373-383, XP004124958.

Pelly J et al: "UMID watermarking for managing metadata in content production" SMPTE Journal Soc. Motion Picture & Telev. Eng USA, vol. 110, No. 7, Jul. 2001, pp. 429-435, XP008035229.

C. Valens, "*A Really Friendly Guide To Wavelets*", 1999 (c.valens{fourth root}mindless.com)

SMPTE Journal, *Proposed SMPTE Standard for Television—Unique Material Identifier(UMID)*. Mar. 2000, pp. 221-225.

\* cited by examiner

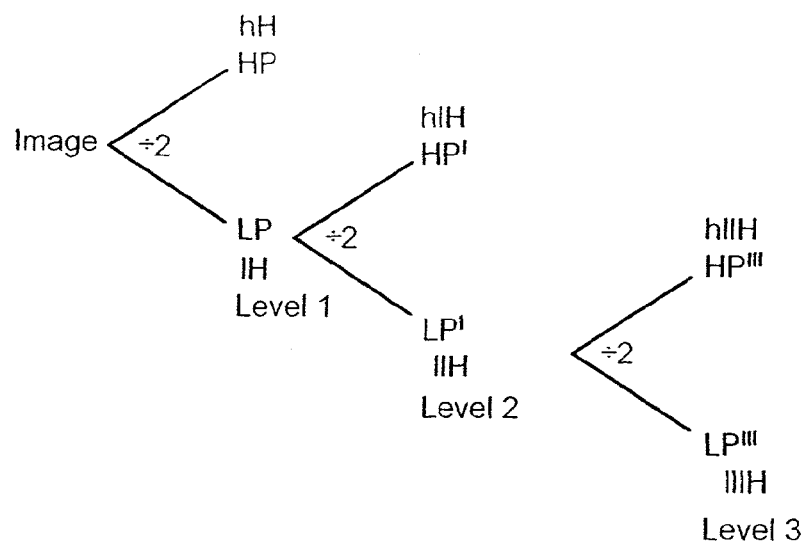
FIG. 3 Schematic of Wavelet Transform
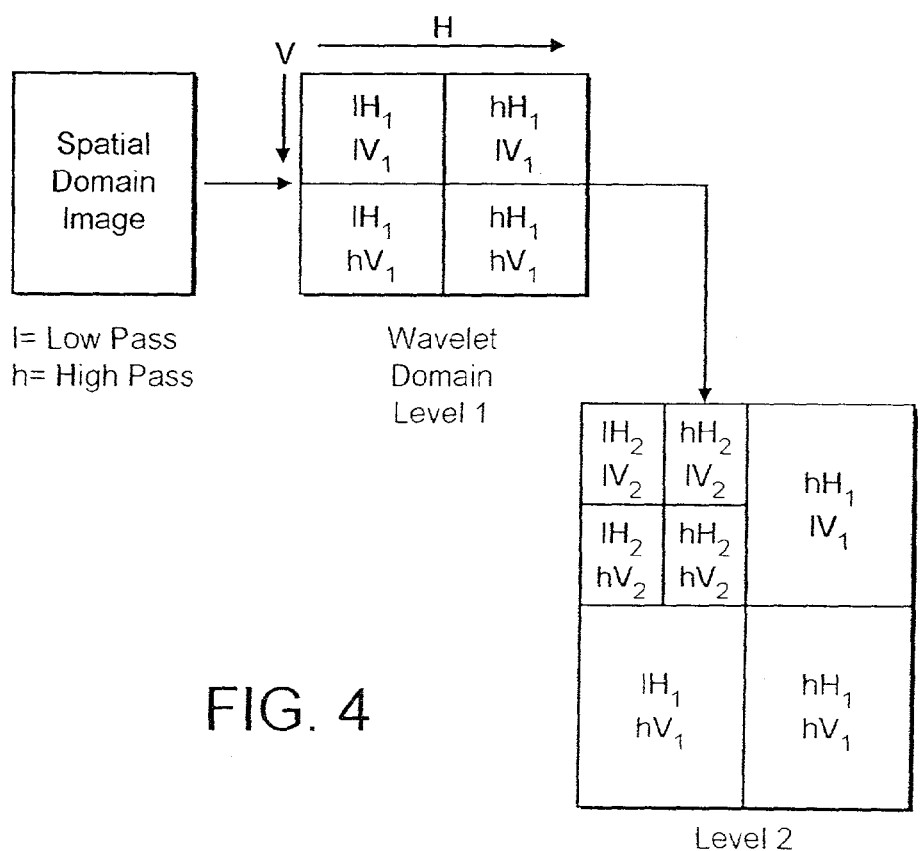
FIG. 4

APPARATUS FOR DETECTING AND RECOVERING DATA

FIELD OF INVENTION

The present invention relates to methods and apparatus for detecting and recovering data embedded in information material.

Information material as used herein refers to and includes one or more of video material, audio material and data material. Video material in this context may be still images or moving images.

BACKGROUND OF INVENTION

Steganography is a technical field relating to the embedding of data into material such as video material, audio material and data material in such a way that the data is imperceptible in the material.

Watermarks are data embedded in material such as video material, audio material and data material. A watermark may be imperceptible or perceptible in the material.

A watermark may be used for various purposes. It is known to use watermarks for the purpose of protecting the material against, or trace, infringement of the intellectual property rights of the owner(s) of the material. For example a watermark may identify the owner of the material.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission. Watermarks may be "fragile" in that they are easily damaged by processing which is useful to detect attempts to remove the mark or process the material.

Visible watermarks are useful to allow, for example, a customer to view an image via, for example, the Internet to determine whether they wish to buy it but without allowing the customer access to the unmarked image they would buy. The watermark degrades the image and the mark is preferably not removable by the customer. Visible watermarks are also used to determine the provenance of the material into which they are embedded.

In U.S. Pat. No. 5,930,369 (Cox et al) it has been proposed to embed data into material such as images to form a watermark by converting the material into the transform domain and adding the data to the image in the transform domain. For the example of images and the Discrete Wavelet Transform of these images into the transform domain, the data to be added can be combined with the wavelet coefficients of one of a plurality of sub-bands which are formed in the transform domain. Generally, the data to be embedded is arranged to modulate a predetermined data sequence such as a Pseudo Random Bit Sequence (PRBS). For example, each bit of the data to be embedded is arranged to modulate a copy of the PRBS, and this copy is then added, for example into one of the sub-bands of the image in the transform domain. The image is then converted back to the spatial domain.

If it is desired to detect and recover the embedded data from the image, the image is converted back to the transform domain and the embedded data is recovered from the sub-band in the transform domain by correlating the transform coefficients in the sub-band with the predetermined data sequence which is known to the detecting apparatus. Data sequences such as PRBSs have properties which provide a high auto-correlation result when the sequence coincides with itself and a low or ideally zero correlation result at all other shifts of the sequence with respect to itself. As such, the embedded data can be recovered from the result of correlating the sub-band data with the predetermined data sequence.

SUMMARY OF INVENTION

According to the present invention there is provided an apparatus for detecting and recovering data embedded in information material, the data having been embedded in the material using a transform domain representation of at least one of the data and information material by arranging for the data to modulate a predetermined data sequence to form modulated data and combining the modulated data with the material. The apparatus comprises a transform processor operable to transform the material into the transform domain representation of the information material, and a correlation processor operable to correlate transform domain data symbols bearing the modulated data from the transform domain representation with a reproduced version of the predetermined data sequence to form a correlation output signal. The embedded data is recovered from the correlation output signal. The correlation processor is operable to perform the correlation of transform domain data symbols with data symbols of the predetermined data sequence for a plurality of start positions in the transform domain. The start positions represent at least one relative possible shift of the transform domain data, and if the shift of the transform data represents a loss or corruption of transform domain data symbols, corresponding symbols are omitted from the predetermined data sequence in the correlation. The lost or corrupted transform domain data symbols and the corresponding symbols of the predetermined data sequence are not included in calculating the correlation output signal.

Information material such as images are processed in order to convert them from one form to another, so that, for example the images can be compression encoded and decoded. A result of processing the image may be to introduce a shift in the image in the transform domain or the spatial domain with an effect that some of the transform domain data symbols may be lost or corrupted. Furthermore, if the data in the transform domain has shifted from its original position, it may not be possible to detect the embedded data from the correlation of the transform domain symbols with the reproduced predetermined data sequence, because the predetermined data sequence will no longer align with the modulated version added to the transform domain. The amount of the shift will be unknown.

Generally, a previous proposal has been to add the data to be embedded to the transform domain in a central region only, leaving a number of pixels at either edge where data is not added. This previous proposal overcomes the disadvantage that the data at the edges of the image may be lost or corrupted if the image is shifted. However this is at the expense of a reduction in the capacity for embedding data for each transform domain image.

Embodiments of the present invention can utilise the entire transform domain providing an increased data embedding capacity. In order to detect and recover this data, the data is added to the transform domain in combination with a predetermined data sequence, each data symbol of the data to be embedded being arranged to modulate a copy of the predetermined data sequence. In the apparatus for detecting and recovering the data, each of the embedded data symbols is recovered by correlating the data symbols in the transform domain with a reproduced version of the predetermined data sequence. The correlation is repeated for each of a plurality of start positions within the transform domain, at least one of the start positions representing possible shifts of the transform domain data symbols. The embedded data may be recovered from the correlation output signal, in spite of a shift of the transform domain data, provided that the start positions of the correlation include a start position representing the actual shift which has been introduced into the transform domain data symbols.

Where it is possible that the shift of the data within the transform domain corresponding to a particular start position is representative of a loss or corruption of transform domain data symbols, for example at the edges of the transform domain, symbols from the predetermined data sequence corresponding to the lost or corrupted transform domain symbols are omitted from the correlation, the lost or corrupted transform domain data symbols and the corresponding symbols of the predetermined data sequence are therefore not included in calculating the correlation output signal. The number of transform domain symbols lost is therefore also the number of the corresponding symbols discounted from the reproduced version of the predetermined sequence, thus maintaining the correspondence between the symbols of the correlating version of the predetermined sequence and the symbols of the predetermined sequence which form the modulated data.

As will be appreciated therefore, in preferred embodiments the plurality of start positions includes representations of a plurality of possible shifts of the transform domain symbols from an original position in which the modulated data was combined with the symbols.

A shift of the information material can cause a loss of symbols from one edge of the transform domain representation and also cause symbols at the opposite edge to be corrupted. Therefore, when performing a correlation which would otherwise have included these symbols, the corresponding symbols of the reproduced data symbols are excluded from the correlation sum. By discounting these symbols when calculating the correlation a potentially disrupting effect of these possibly corrupted or lost data symbols is avoided, whilst providing correspondingly a facility for utilising the entire data bearing capacity in the transform domain for embedding data.

Although a shift of the information material by a number of data symbols may cause a shift of a corresponding number of data symbols in the transform domain, some transforms may result in a different shift being produced in the transform domain than the un-transformed domain of the information material. Therefore, a shift of the information material by a first number of data symbols, may produce a shift by a second number of transform domain symbols. For this reason, the apparatus may comprise a control processor operable to shift the information material by an amount determined in accordance with the first and second numbers to the effect that the plurality of start positions of said correlation of said predetermined data sequence with the transform domain data symbols can include an integer shift of the information material in the un-transformed domain. By pre-shifting the information material before being transformed into the transform domain, the start positions corresponding to different shifts of numbers of transform domain data symbols can be made to correspond to integer shifts of information material data symbols.

Considering the example of information material such as images which are transformed using the discrete wavelet transform into the wavelet domain, a shift by a two pixels of the image will cause a shift of one wavelet coefficient in the wavelet transform domain. As such a shift of 0, 1, 2 and 3 wavelet coefficients for a level one wavelet corresponds to a shift of 0, 2, 4 and 6 pixels of the image. However, it is possible that the image in the spatial domain may be shifted by only a single pixel. As such, shifting the start position of the correlation in the transform domain by a single wavelet coefficient will not correspond to the actual shift of the transform domain image, and so the correlation output signal may not be large enough for the data to be recovered. However by pre-shifting the image by one pixel, the transform domain shifts of 0, 1, 2 and 3 wavelet coefficients will correspond to 1, 3, 5 and 7 pixels, which include the actual shift introduced into the image.

In preferred embodiments the transform domain may have a plurality of sub-bands, the modulated data being added to at least one of the sub-bands, the correlation processor being operable to correlate the modulated data with the predetermined data sequence except the excluded data symbols.

Although it will be understood that any suitable transform may be used to transform the image into sub-bands, in preferred embodiments, the transform is the Discrete Wavelet Transform (DWT), the data symbols in each of the sub-bands comprising wavelet coefficients.

Although embodiments of the invention find application in detecting and recovering data from any information material, a particular application of the invention is in detecting and recovering data embedded in video image or audio signals.

According to a second aspect of the present invention there is provided an apparatus for detecting and recovering data embedded in information material, the data having been embedded in the information material by modulating a predetermined data sequence with the data to be embedded to form modulated data and combining the modulated data with the information material. The apparatus comprises a correlation processor operable in combination with a data sequence processor to form a correlation sequence, and a data processor operable under control of the correlation processor to correlate information material data symbols, to which the modulated data have been combined, with the correlation sequence, to form a correlation output signal representing the correlation between the information material data symbols and the correlation data sequence, and to recover the embedded data from the correlation output signal. The correlation sequence comprises a plurality of predetermined data sequence versions, each version representing a possible form of the predetermined data sequence for recovering the embedded data symbols from the information material.

Data representing information material such as images are often processed in order to convert the data from one form to another, so that, for example the images can be compression encoded and decoded. A further example in which images may be processed is if the images are converted into another form using transform processing. Such transforms may be, for examples, the Discrete Wavelet Transform or the Discrete Fourier or Cosine Transform. A result of processing the material can cause the data representing the material to be shifted, in particular in the transform domain.

If it is desired to recover the embedded data by correlating the modulated data from the transform domain with the predetermined data sequence known to a decoding data processor, it may not be possible to detect the embedded data because the predetermined data sequence will no longer align with the modulated version of the predetermined data sequence, because the data in the transform domain has shifted. Effectively, the shift of the data in the sub-band will have an effect of introducing a corresponding relative shift between the correlating predetermined data sequence and the modulated version of the data sequence in the sub-band. The correlation output signal may be low or zero, thereby preventing the data from being correctly detected.

Similarly, the predetermined data sequence which is modulated by the data to be embedded and combined with the information material may be one of a set of predetermined data sequences. The predetermined data sequence used to embed the data in the information material may be unknown at the decoder.

Embodiments of the present invention provide an improvement in the likelihood of correctly detecting the embedded data by generating a correlation sequence comprising a plurality of predetermined data sequence versions. Each version may be the same predetermined data sequence but shifted with respect to one another. Each shift provides a possible relative shift of the material data in the transform domain at which there would be no shift between this version and the modulated version of the data sequence in the transform domain. A result of the correlation will produced a high output signal value, which when compared with a predetermined threshold provides an indication of the embedded data symbol. All other versions of the predetermined data sequence in the correlation data sequence will produce a low correlation output or zero, and so will not interfere with the detection of the embedded data symbol. This is because predetermined data sequences such as PRBSs have such correlation properties that the other shifted versions of the PRBS will represent noise with respect to the correlation with the wanted signal. Therefore provided the correlation output signal is high enough in the presence of the other shifted versions the embedded data symbol can be detected from the transform domain data in spite of any shifts of the transform domain data. Generally, it is not necessary to know which of the shifted versions in the correlation data sequence aligns with the predetermined data sequence of the embedded data.

In preferred embodiments, the number of versions of the predetermined data sequence may be equal to a number of possible relative shifts of the modulated predetermined data sequence, each of the plurality of predetermined data sequences being shifted with respect to each other, each shift representing a number of symbols by which the modulated data symbols may have shifted in the transform domain.

In alternative embodiments, in which the predetermined data sequence used to form the modulated data is one of a set of predetermined data sequences, each of said predetermined data sequence versions of the correlation data sequence is a different predetermined data sequence of the set of possible predetermined data sequences which may have been used to form the modulated data. As will be appreciated, the wanted predetermined data sequence which corresponds to the predetermined data sequence used to be embed the data will produce a correlation result from which the embedded data can be recovered, whereas the other sequences will form noise. The embedded data may be recovered therefore, without knowing which of the predetermined data sequences was used to embed the data.

In preferred embodiments, the correlation sequence may be formed by selecting versions of the predetermined data sequence and reversing the polarity of the selected versions of the predetermined data sequence. It has been found that by reversing the polarity of selected versions of the predetermined data sequence, for example, reversing the polarity of alternate predetermined data sequence versions a reduction of the interference of the unwanted versions is provided with respect to the wanted version of the predetermined data sequence.

As will be appreciated from the foregoing description, in preferred embodiments, the predetermined data sequence is a PRBS. The correlation sequence therefore comprises a plurality of versions of the PRBS each being shifted with respect to each other.

In preferred embodiments the data may be combined with the information material in a transform domain representation of the information material. As a result, the effect of for example a data symbol combined with a transform domain data symbol may be spread over several information material data symbols, thereby reducing any perceivable effect on the information material. Any appropriate transform may be used. However, in preferred embodiments, the transform may be the discrete wavelet transform, the data symbols in the transform domain being divided into each of a plurality of sub-bands comprising wavelet coefficients, the data being added to at least one of the sub-bands.

Although the information material in which the data has been embedded can be any form or type of material, in preferred embodiments the information material is video, audio or audio/video material.

Various further aspects and features of the present invention are defined in the appended claims.

BRIEF DESCRIPTION OF THE DRAWINGS

Embodiments of the present invention will now be described by way of example only with reference to the accompanying drawings, where like parts are provided with corresponding reference numerals, and in which:

FIG. 3 is a schematic representation illustrating the form of the wavelet domain transform;

FIG. 4 is a schematic representation of an iterative filtering process which can be used to form the wavelet transform;

DESCRIPTION OF PREFERRED EMBODIMENTS

An example embodiment of the present invention will be described with reference to a watermarking system in which data is embedded into a video image. Any type of data can be embedded into the image. However, advantageously the data embedded into the image may be meta data which describes the image or identifies some attributes of the content of the image itself. An example of meta data is the Universal Material Identifier (UMID). A proposed structure for the UMID is disclosed in SMPTE Journal March 2000. A more detailed explanation of the structure of the UMID will be described later.

Watermarking System

Figure 1:
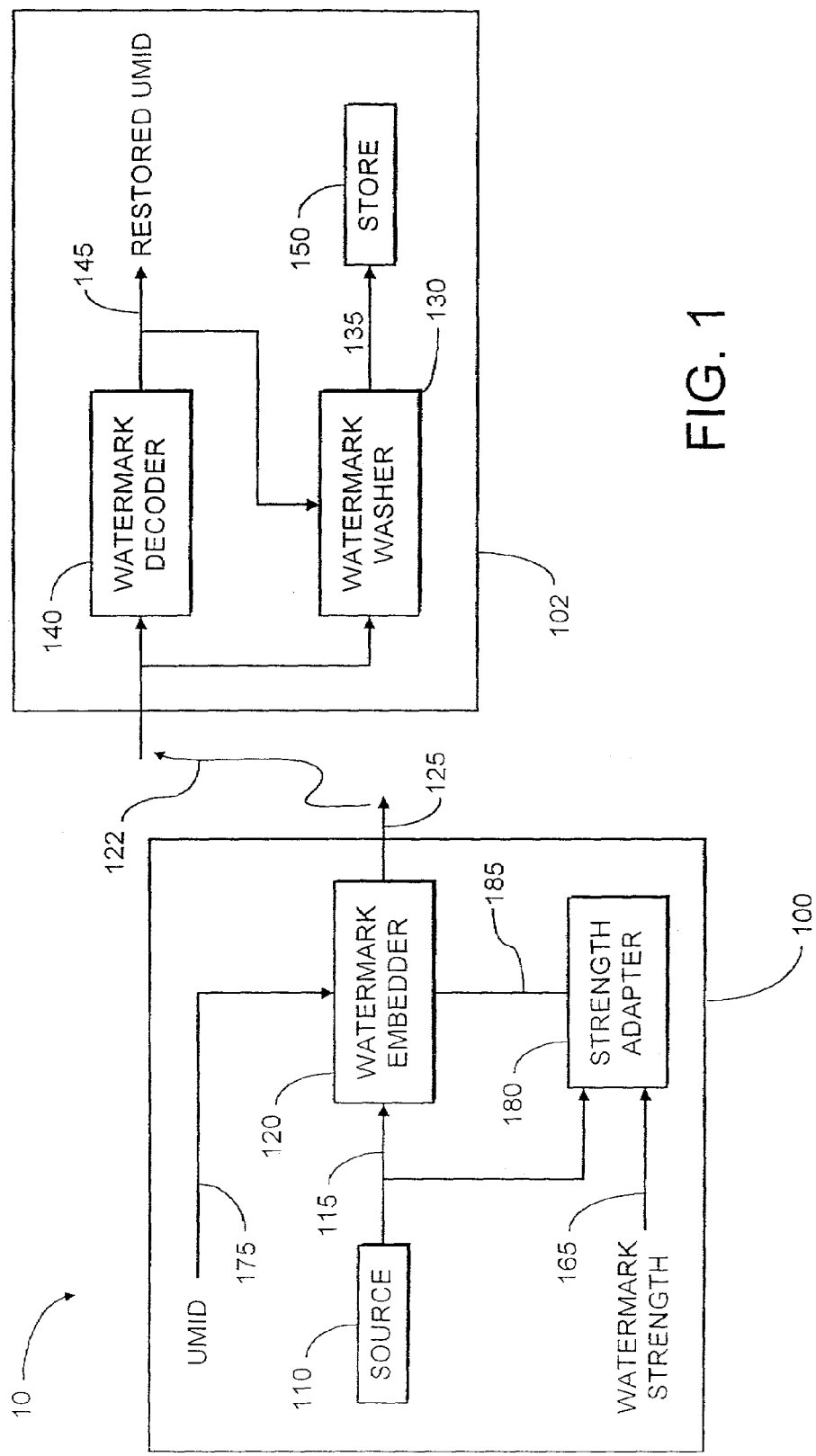
FIG. 1 is a schematic block diagram of a watermarking system.

FIG. 1 illustrates a watermarking system, generally 10, for embedding a watermark into a video image 115, and recovering and removing a watermark from the watermarked image 125. The watermarking system 10 in FIG. 1 comprises an image processor 100 for embedding the watermark into the video image, and a decoding image processor 102 for detecting and recovering the watermark, and for removing or 'washing' the watermark from the video image.

The image processor 100 for embedding the watermark into the video image comprises a strength adapter 180, and a watermark embedder 120. The watermark embedder 120 is arranged to embed the watermark into the video image 115, produced from the source 110, to form a watermarked image 125. The watermark to be embedded into the video image is formed from data 175 representing a UMID. Generally, the UMID identifies the content of the video image, although it will be appreciated that other types of meta data which identify the content or other attributes of the image can be used to form the watermark. In preferred embodiments the watermark embedder 120 embeds the UMID into the video image 115 in accordance with a particular application strength 185 from the strength adapter 180. The strength adapter 180 determines the magnitude of the watermark in relation to the video image 115, the application strength being determined such that the watermark may be recovered whilst minimising any effects which may be perceivable to a viewer of the watermarked image 125. After embedding the watermark, the image may be transmitted, stored or further processed in some way, such as for example, compression encoding the image. This subsequent processing and transmitting is represented generally in FIG. 1 as line 122.

In FIG. 1 the decoding image processor 102 for detecting and removing the watermark is shown as comprising a watermark decoder 140, a data store 150 and a watermark washer 130 which removes the watermark from the watermarked image 125.

The watermark decoder 140 detects the watermark from the watermarked video image and in the present example embodiment, generates a restored UMID 145 from the watermarked image 125. The watermark washer 130 generates a restored image 135, by removing as far as possible the watermark from the watermarked image 125. In some embodiments, the watermark washer 130 is operable to remove the watermark from the image substantially without leaving a trace. The restored image 135 may then be stored in a store 150, transmitted or routed for further processing.

The Watermark Embedder

Figure 2:
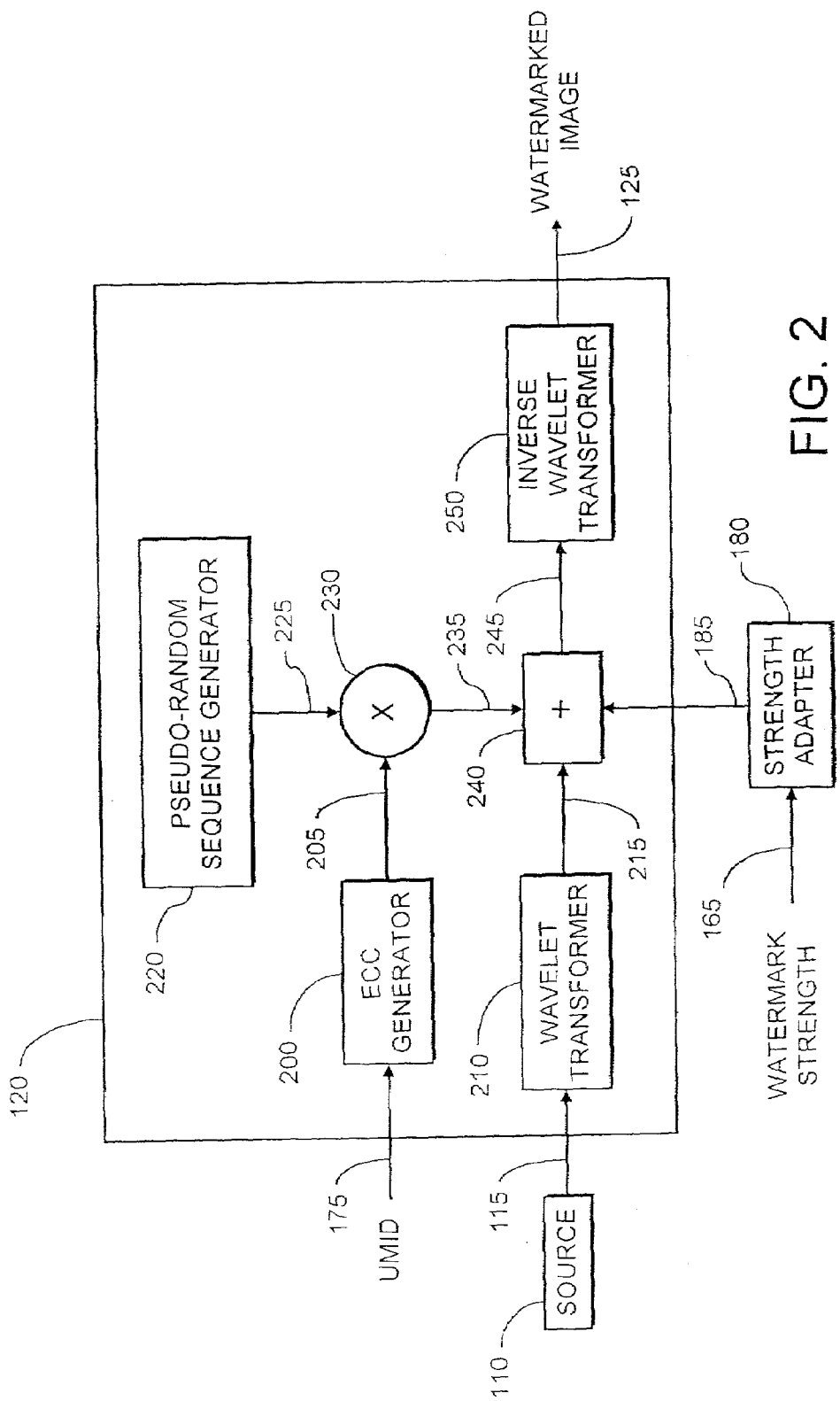
FIG. 2 is a schematic block diagram of a watermark embedder appearing in FIG. 1.

The watermark embedder will now be described in more detail with reference to FIG. 2, where parts also appearing in FIG. 1 have the same numerical references. In FIG. 2 the watermark embedder 120 comprises a pseudo-random sequence generator 220, an error correction encoder 200, a wavelet transformer 210, an inverse wavelet transformer 250, a modulator 230 and a combiner 240.

The error correction encoder 200 receives the UMID 175 and generates an error correction encoded UMID comprising redundant data in combination with the UMID, in accordance with an error correction encoding scheme. It will be appreciated that various error correction coding schemes could be used to encode the UMID.

The UMID in the example embodiment is a binary sequence of 31 bytes. Applying for example, a Bose-Chaudhuri-Hocquenghem (BCH) code, the 31-bytes are converted to a 511-bit encoded binary sequence. Such a BCH code word can correct up to 31-bit errors, and detect a greater number of errors, which may be clusters or bursts of errors.

As shown in FIG. 2 the error correction encoded UMID 205 is received at a first input to the modulator 230. The pseudo-random sequence generator 220 outputs a PRBS 225 which is received at a second input to the modulator 230. The modulator 230 is operable to modulate each copy of a PRBS, generated by the pseudo-random sequence generator 220, with each bit of the error correction encoded UMID. In preferred embodiments the PRBS is modulated by representing the values of each bit of the PRBS in bipolar form ('1' as +1, and '0' as −1) and then reversing the polarity of each bit of the PRBS, if the corresponding bit of the encoded UMID is a '0' and not reversing the polarity if the corresponding bit is a '1'. The modulated PRBS is then received at a first input of the combiner 240. The combiner 240 receives at a second input the image in which the PRBS modulated data is to be embedded. However the data is combined with the image in the transform domain.

The use of a pseudo-random sequence 225 to generate the spread spectrum signal representing the watermark data allows a reduction to be made in the strength of the data to be embedded in the image. By correlating the data in the transform domain image to which the modulated PRBS has been added, a correlation output signal is produced with a so called correlation coding gain which allows the modulated data bit to be detected and determined. As such, the strength of the data added to the image can be reduced, thereby reducing any perceivable effect on the spatial domain image. The use of a spread spectrum signal also provides an inherent improvement in robustness of the image because the data is spread across a larger number of transform domain data symbols.

As shown in FIG. 2, the wavelet transformer 210 receives the video image 115 from the source 110 and outputs a wavelet image 215 to the combiner 240. The image is thus converted from the spatial to the transform domain. The combiner 240 is operable to add the PRBS modulated data to the image in the transform domain, in accordance with the application strength, provided by the strength adapter 180. The watermarked wavelet image 245 is then transformed into the spatial domain by the inverse wavelet transformer 250 to produce the watermarked image 125. The operation of the combiner 240 will be explained in more detail shortly.

In order to explain the embodiment of the present invention a brief description of wavelet transforms will be provided in the following paragraphs with reference to FIGS. 3 and 4.

The Wavelet Transform

Wavelets are well known and are described in for example "A Really Friendly Guide to Wavelets" by C Valens, 1999 (c.valens@mindless.com). Valens shows that the discrete wavelet transform can be implemented as an iterated filter bank, as used in sub-band coding, with scaling of the image by a factor of 2 at each iteration.

Thus, referring to FIG. 3 a spatial domain image is applied to a set of high pass HP and low pass LP filters. At level 1, the first stage of filtering, the image is filtered horizontally and vertically and, in each direction, scaled down by a factor of 2. In level 2, the low pass image from level 1 is filtered and scaled in the same way as in level 1. The filtering and scaling may be repeated in subsequent levels 3 onwards.

The result is shown schematically in FIG. 4. FIG. 4 is a representation normal in the art. The horizontal axis H indicates increasing frequency of the sub-bands. At level one the image is spatially filtered into four bands; the lower horizontal and vertical band, $1H_1, 1V_1$; the upper horizontal band $hH_1, 1V_1$; the upper vertical band $1H_1, hV_1$; and the upper horizontal and vertical band, $hH_1, hV_1$. At level 2, the lower horizontal and vertical band, $1H_1, 1V_1$ is filtered and scaled into the lower horizontal and vertical band, $1H_2, 1V_2$; the upper horizontal band $hH_2, 1V_2$; the upper vertical band $1H_2, hV_2$; and the upper horizontal and vertical band, $hH_2, hV_2$. At level 3 (not shown in FIG. 4), the lower horizontal and vertical band, $1H_2, 1V_2$ is further filtered and scaled.

Combiner

The operation of the combiner 240 will now be explained in more detail. The combiner 240 receives the wavelet image 215 from the wavelet transformer 210, and the modulated PRBS from the modulator 230 and the application strength 185 from the strength adapter 180. The combiner 240 embeds the watermark 235 onto the wavelet image 215, by adding, for each bit of the modulated PRBS a factor α scaled by ±1, in dependence upon the value of the bit. Selected parts of the wavelet image 215 are used to embed the watermark 235. Each coefficient of the predetermined region of the wavelet image 215 is encoded according to the following equation:

$$X_i' = X_i + \alpha_n W_i \qquad (1)$$

Where $X_i$ is the i-th wavelet coefficient, $\alpha_n$ is the strength for the n-th PRBS and $W_i$ is the i-th bit of the modulated PRBS in bipolar form.

Figure 5:
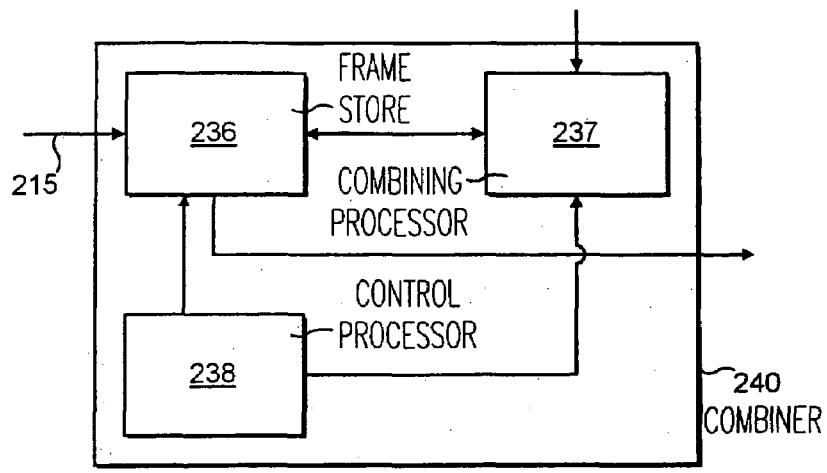
FIG. 5 is a schematic block diagram of a combiner forming part of the watermark embedder shown in FIG. 2.

The operation of the combiner will now be described with reference to FIGS. 5, 6 and 7. In FIG. 5 the combiner 240 is shown to receive the transform domain image from the connecting channel 215 which provides the transform domain image to a frame store 236. The frame store 236 is arranged to store a frame of transform domain data. The combiner 240 is also arranged to receive the spread spectrum encoded and error correction encoded UMID after it has been spread using the PRBS (modulated PRBS data). For this example embodiment one UMID in this error correction and spread spectrum encoded form is to be embedded in the frame of image data within the frame store 236. Thus, each encoded UMID forms an item of data which is to be embedded into each frame of image data. To this end, the frame store stores a frame of data representing the image in the wavelet transform domain. The data to be embedded is received at a combining processor 237 which combines the data to be embedded into selected parts of the wavelet transform domain image stored in the frame store 236. The combiner 240 is also provided with a control processor 238 which is coupled to the combining processor 237.

Figure 6:
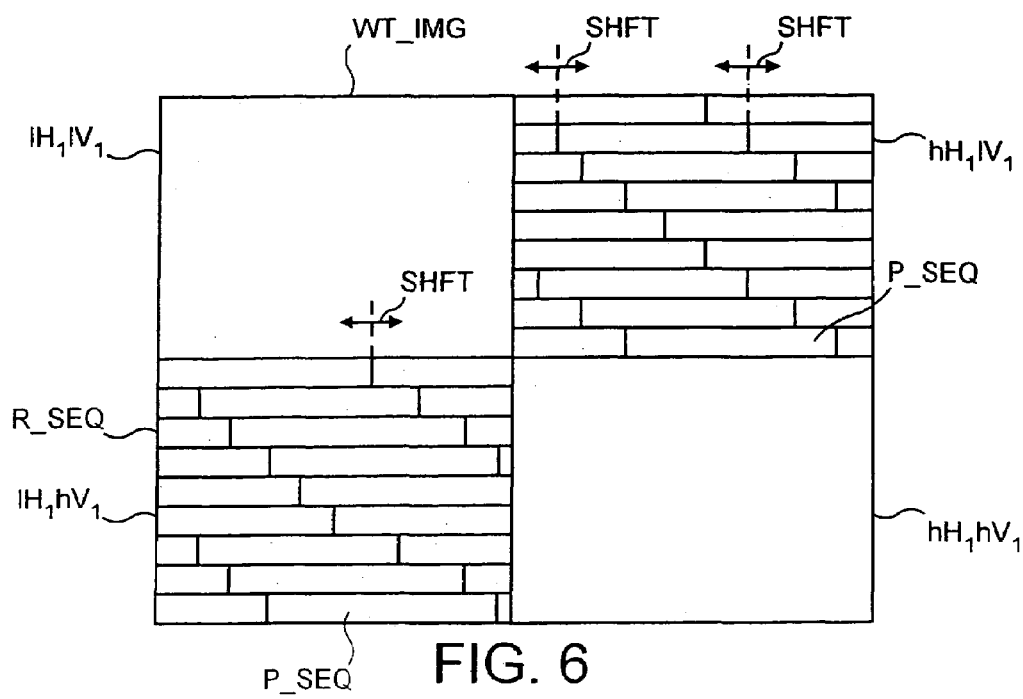
FIG. 6 provides an illustrative representation of a transform domain image in which data is added by the combiner shown in FIG. 5.
Figure 7:
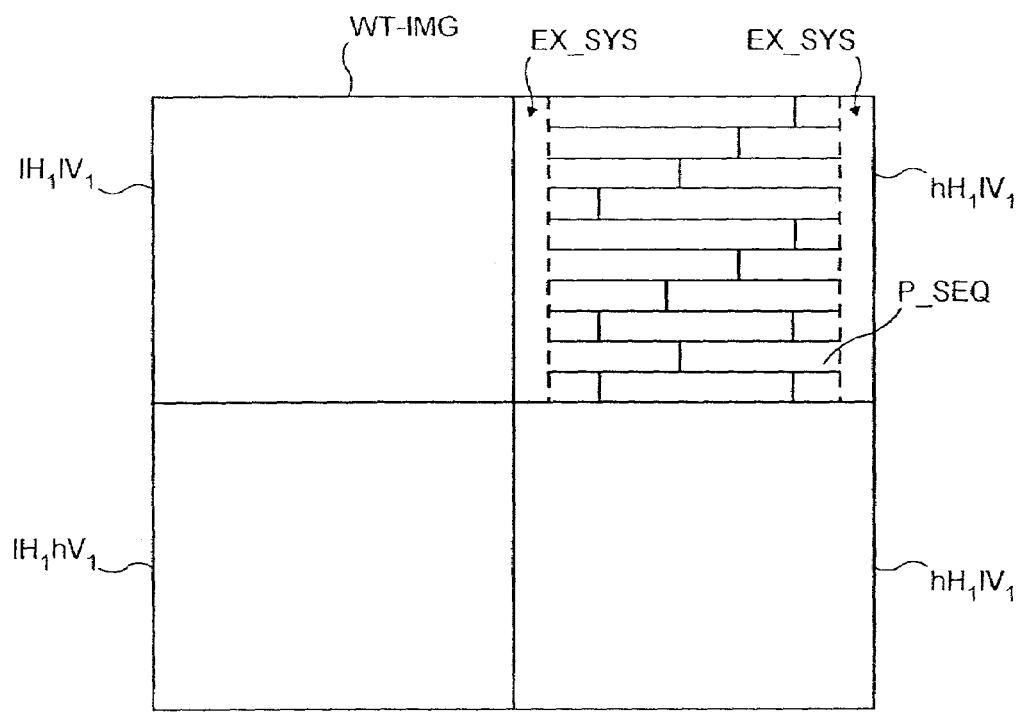
FIG. 7 provides an illustrative representation of a transform domain image in which data is added in accordance with a previous proposal.

In FIG. 6 an illustrative representation of a first order wavelet transform is presented. This wavelet transform is representative of a frame of the image transformed into the wavelet domain and stored in the frame store 236. The wavelet transform image WT_IMG is shown to comprise four wavelet domains representative of sub-bands into which the image has been divided. The wavelets have been labelled in correspondence with the illustration provided in FIG. 3. In the example embodiment of the present invention, the data to be embedded is only written into the low vertical, high horizontal frequencies sub-band $hH_1 1V_1$ and the low horizontal, high vertical frequencies sub-bands labelled $1H_1 hV_1$.

By embedding the data in only the two sub-bands $hH_1 1V_1, 1H_1 hV_1$, the likelihood of detecting the embedded data is improved whilst the effects that the embedded data will have on the resulting image are reduced. This is because the wavelet coefficients of the high horizontal, high vertical frequencies sub-bands $hH_1 hV_1$ are more likely to be disturbed, by for example compression encoding. Compression encoding processes such as JPEG (Joint Photographic Experts Group) operate to compression encode images by reducing the high frequency components of the image. Therefore, writing the data into this sub-band $hH_1 hV_1$ would reduce the likelihood of being able to recover the embedded data. Conversely, data is also not written into the low vertical, low horizontal frequencies sub-band $1H_1 1V_1$. This is because writing data into this sub-band would have a more disturbing effect on the image, since the low frequency components of the image have generally lower energy than the higher frequency components. Therefore, writing the data in the low vertical, low horizontal frequencies sub-band would have a more disturbing effect on the image. As a compromise the data is added into the high horizontal, low vertical frequencies sub-band $hH_1 1V_1$ and the low horizontal, high vertical frequencies sub-bands $1H_1 hV_1$.

In accordance with an example embodiment of the present invention, the combiner 240 uses the entire width of the sub-band to embed the data.

As already explained, an effect of processing the image in the spatial or the transform domains is to shift the wavelet coefficients in the sub-band with an effect that coefficients at the edges of the sub-band could be lost or corrupted. Thus the sub-band includes a region in which the transform domain data symbols (wavelet coefficients) may not be recoverable. To illustrate this problem FIG. 7 shows a previously proposed arrangement in which the embedded data unit is not written into or added with wavelet coefficients at the edges of the sub-band EX_SYS. However an effect of this is to reduce the data bearing capacity of the sub-band. Conversely this can be considered as representing a reduction in the error correction capacity which can be added to the embedded data.

Figure 8:
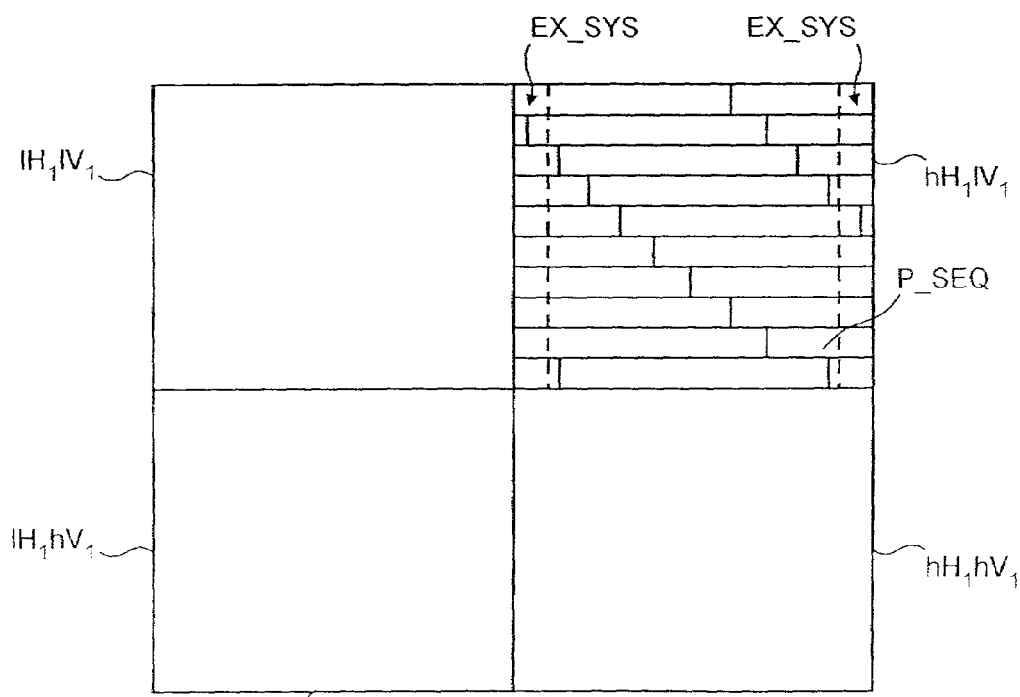
FIG. 8 provides an illustrative representation of a transform domain image in which data is added in accordance with an example embodiment of the present invention.

Thus as illustrated in FIG. 8 the entire sub-band comprising all wavelet coefficients between the edges of the sub-band are used to convey data. To this end, the spread spectrum encoded data is added to the wavelet coefficients as illustrated by the boxes P_SEQ. However, as represented by a region EX_SYS between the edge of the sub-band and a broken line, in common with the arrangements shown in FIG. 8, the data symbols in the region designated EX_SYS at the edges of the sub-band will have wavelet coefficients which may be lost or corrupted, due to processing or shifting the image. Embodiments of the present invention address the problem of recovering the embedded data in spite of the loss or corruption of the data symbols within the region EX_SYS at the edges of the sub-band. The detection and recovery of the embedded data is performed by the watermark decoder 140 forming part of the decoding image processor 102 shown in FIG. 1.

Decoder

Figure 9:
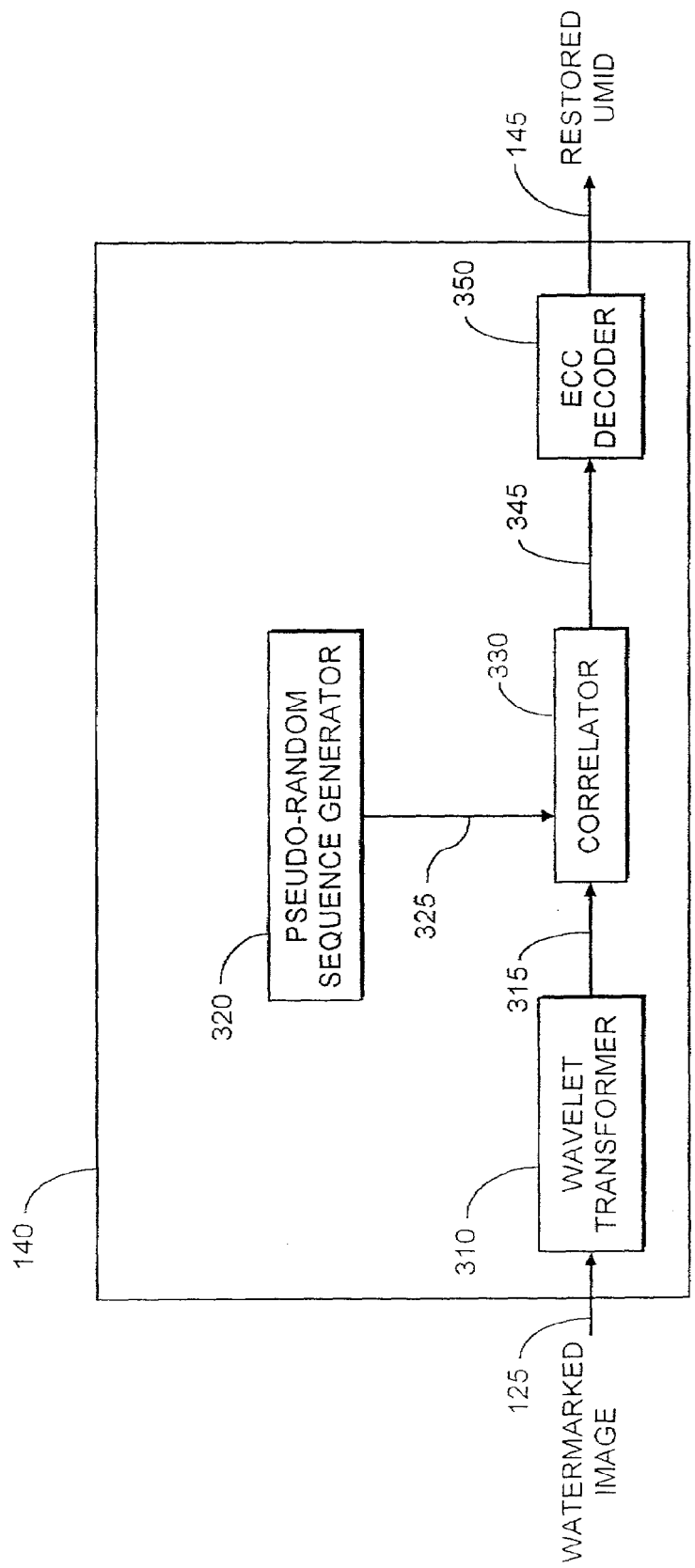
FIG. 9 is a schematic block diagram of a watermark decoder appearing in FIG. 1.

The operation of the watermark decoder 140 in the decoding image processor, will now be explained in more detail, with reference to FIG. 9, where parts also appearing in FIG. 1, bear identical reference numerals. The watermark decoder 140 receives the watermarked image 125 and outputs a restored version of the UMID 145. The watermark decoder 140 comprises a wavelet transformer 310, a pseudo-random sequence generator 320, a correlator 330, and an error correction decoder 350.

The wavelet transformer 310 converts the watermarked image 125 into the transform domain so that the watermark data can be recovered. The wavelet coefficients to which the PRBS modulated data were added by the combiner 240 are then read from the two wavelet sub-bands $hH_1 1V$, $1H_1 hV_1$. These wavelet coefficients are then correlated with respect to the corresponding PRBS used in the watermark embedder. Generally, this correlation is expressed as equation (2), below, where $X_n$ is the n-th wavelet coefficient and $R_n$ is the n-th bit of the PRBS generated by the Pseudo Random Sequence Generator 320. However as will be explained shortly, in some embodiments not all the coefficients from the wavelet may be used to form the correlation sum according to equation (2).

$$C_n = \sum_{i=1}^{s} X_{sn+i} R_i \qquad (2)$$

The relative sign of the result of the correlation Cn then gives an indication of the value of the n-th bit of the embed data in correspondence with the sign used to represent this bit in the watermark embedder. The data bits recovered in this way represent the error correction encoded UMID which is subsequently decoded by the error correction decoder 350 using a decoding algorithm for the error correction code used by the encoder 200. Having recovered the UMID, the watermark can be removed from the video image by the watermark washer 130, by performing the reverse of the operations performed by the embedder. The correlator 330 appearing in FIG. 9 is shown in more detail in FIG. 10, wherein parts also appearing in FIG. 9 bear identical numerical references.

Figure 10:
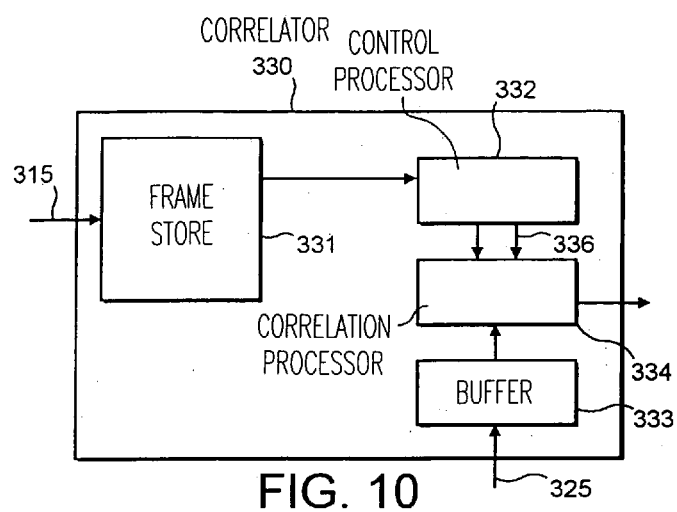
FIG. 10 is a schematic block diagram of a correlator forming part of the watermark decoder shown in FIG. 9.

In FIG. 10 the correlator 330 is shown to comprise a frame store 331 which is arranged to receive the wavelet transformed image via the connecting channel 315. The frame store 331 is arranged to store a frame of wavelet transformed image. A control processor 332 is arranged to select wavelet coefficients from the frame store 331, and to feed selected coefficients to a correlation processor 334. The control processor 332 also controls a buffer 333. The selected wavelet coefficients will be a consecutive set of coefficients to which one modulated PRBS is assumed to have been added. The buffer receives the PRBS from the PRBS generator 320 and to feed this PRBS in sync with a timing signal received from a correlation processor 333, via timing channel 336. The correlation processor 333 controls the correlation of the data symbols (wavelet coefficients) read from the sub-band of the image in the frame store 331 with the PRBS. However, to recover the embedded data the reproduced PRBS should be aligned with the corresponding modulated version of the PRBS added to respective wavelet coefficients from the sub-band. The correlation is performed by the data processor 334, under control from the correlation processor 333, using control channel 337, and the data sequence processor 332.

Decoder According to a First Embodiment

FIRST EXAMPLE

Figure 11:
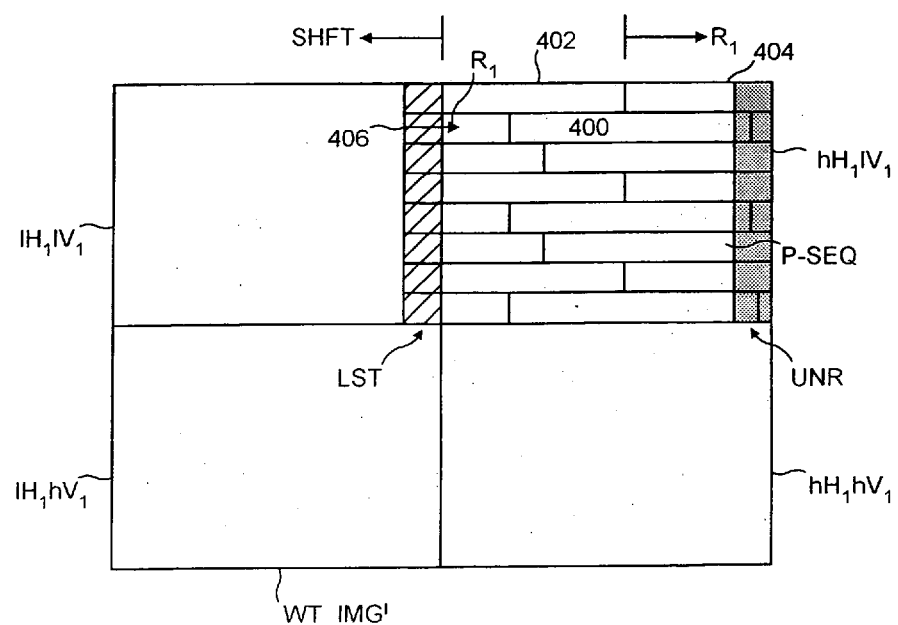
FIG. 11 provides an illustrative representation of a transform domain image from which embedded data is recovered by the correlator of FIG. 9.

The control processor 332 controls the correlation of the data symbols (wavelet coefficients) read from the sub-band of the image in the frame store 331 with the PRBS in accordance with equation (2). However as explained, the image may have suffered a shift in the spatial domain, with the effect that a corresponding shift has occurred in the wavelet domain. For the example of the wavelet transform, a shift of two pixels of the image in the spatial domain will cause a shift of one wavelet coefficient for a level one wavelet. Therefore, a shift of 0, ±1, ±2 ±3 wavelet coefficients is representative of a shift of 0, ±2, ±4, and ±6 pixels of the image in the spatial domain. However, the control processor is arranged to accommodate possible shifts of the image, so that the PRBS in the correlator can be aligned with the modulated PRBS added to the wavelet coefficients. The operation of the correlator 330 in order to recover the embedded data is illustrated in FIGS. 11, 12, 13 and 14. In FIG. 11, the wavelet transformed image $WT\_IMG^1$ as produced by the wavelet transformer 310 is shown in the form as it would appear as an illustrative example in the frame store 331. The representation shown in FIG. 11 corresponds to the representation shown in FIG. 8. For simplicity of explanation, only the high horizontal, low vertical frequencies sub-band will be considered, although it will be appreciated that the data will be recovered from the high vertical, low horizontal frequencies sub-band $hH_1 V_1$ in a similar way. As illustrated the image has suffered a shift to the left SHFT, with the effect that the wavelet coefficients LST at the left hand edge of the sub-band have been lost.

As can be seen in FIG. 11 data symbols from the left hand edge of the sub-band have been lost whereas at the right hand edge of the sub-band, the data symbols are corrupted or at least unreliable as a result of the shift. This is because the right hand edge coefficients have been effectively introduced by the transform to supplement the sub-band coefficients which have been lost as a result of the processes applied to the image. However as will be appreciated the actual amount of shift of the image in the wavelet domain will be unknown at the correlator. Therefore, in order to accommodate a shift of the wavelet domain data in the sub-band so that the embedded data may still be detected and recovered from the sub-band, the correlation is performed repeatedly by the correlation processor 334 for consecutive wavelet coefficients starting from a plurality of start positions each of which is representative of a possible shift of the wavelet coefficients. For each start position, the magnitudes of the results of correlating the PRBS with the wavelet coefficients corresponding to a plurality of embedded data bits are combined to form a combined correlation result. The start position which produces the largest combined correlation result is determined to correspond to the actual shift which has been introduced into the image. The operation of the control processor 332 in combination with the correlation processor 334 is illustrated schematically in FIGS. 12, 13 and 14.

Figure 12:
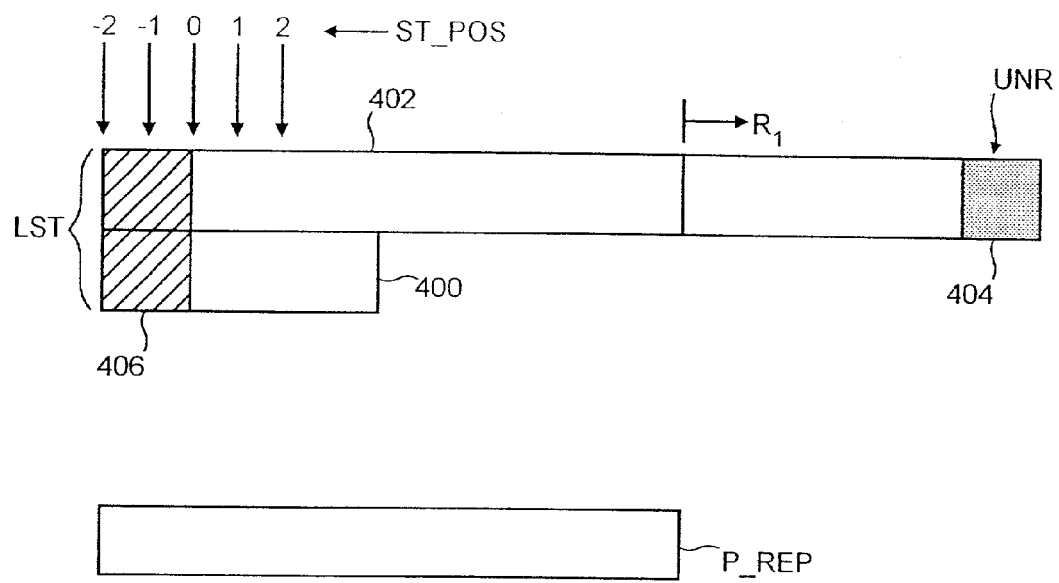
FIG. 12 is a schematic representation of the operation of the control processor and correlation processor forming part of the correlator of FIG. 10, to detect and recover data from the transform domain image of FIG. 11 in the presence of shifts of the image.
Figure 13:
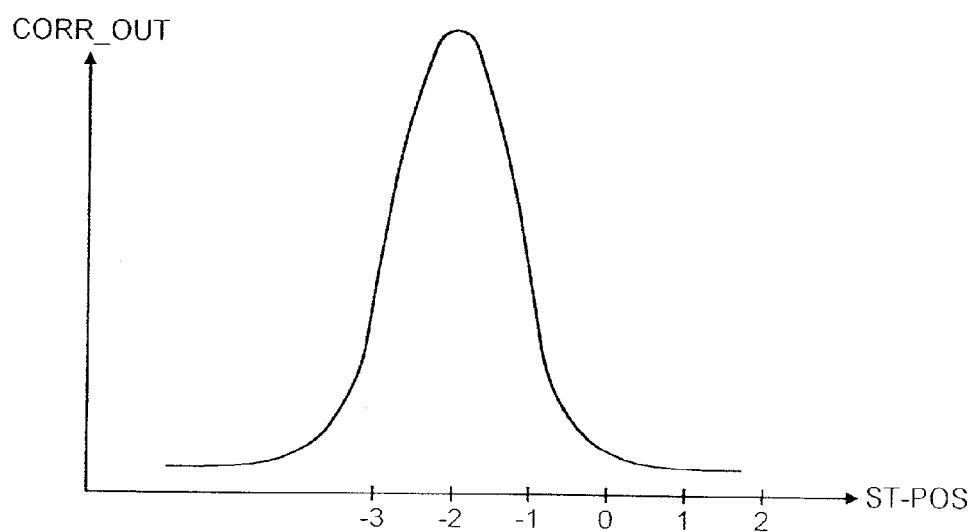
FIG. 13 provides a graphical illustration of a correlation output signal with respect to start positions of the correlation.

In FIG. 12 a section from the top of the high horizontal, low vertical frequencies sub-band $hH_1V_1$ shown in FIG. 11 is represented in an expanded form. In FIG. 12 the sections 400, 402, 404, 406 represent wavelet coefficients with which modulated versions of the PRBS have been added. The hatched region LST at the left hand end of two of the sections 400, 406 represent wavelet coefficients which have been lost as a result of the shift. A shaded region UNR at the right hand edge of a part of a modulated section of coefficients 404 represents unreliable coefficients. Each complete section, for example, the second section 402 represents a sequence of wavelet coefficients with which a modulated PRBS has been added. In order to recover the embedded data symbol represented by this set of wavelet coefficients, the reproduced PRBS P_REP must align with the sequence of wavelet coefficients with which the complete PRBS has been added. This is achieved by the correlation processor 334 in combination with the control processor 332 by correlating the reproduced PRBS P_REP with consecutive wavelet coefficients starting from each of a plurality of start positions ST_POS. As illustrated in FIG. 12 there are five start positions corresponding to a shift in wavelet coefficients of '−2', '−1', '0', '1', and '2' coefficients from a position represented as start position '0' at which the start of the sequence of wavelet coefficients to which the complete modulated PRBS was originally added by the data embedder 240. The result of the correlation is illustrated graphically in FIG. 13. Since the illustrative example has been shown with a shift to the left of two wavelet coefficients, the combined correlation result for several embedded bit correlations at position '−2' produces the largest magnitude. The embedded data can be recovered from this shift. As shown in FIG. 13, the correlation output signal with the highest value indicates that the shift of the image in the wavelet domain is '−2' coefficients.

In order to detect and recover the embedded data from the sub-band after the image has shifted, the correlation processor 334 operates to exclude the PRBS bits from the correlation sum which correspond to wavelet coefficients which are either lost or corrupted. The number of omitted coefficients corresponds to the shift which is assumed for each of the start positions. Therefore for example if the start position is '−2', then it is assumed that two wavelet coefficients at either of the edges of the sub band are unreliable or lost and therefore the correlation with the corresponding bits of the PRBS are not included in the correlation sum. This is represented in FIG. 14.

Figure 14:
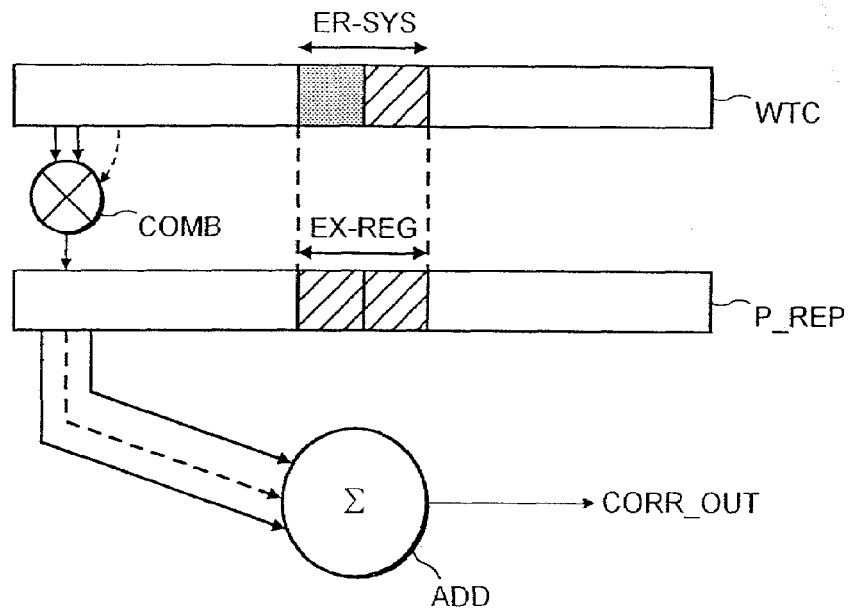
FIG. 14 provides a schematic illustration of the correlation performed by the correlation processor within the correlator of FIG. 10.

As illustrated in FIGS. 12 and 14, the correlation processor 334 operates to read the wavelet coefficients from the sub-band as illustrated by the read arrows R1. FIG. 14 provides a schematic representation of the operation of the data processor 334, where the wavelet coefficients WTC corresponding to one modulated PRBS are shown aligned with the reproduced PRBS P_REP. As shown in FIG. 14, the recovered wavelet transform coefficients which were read from the region at the right hand edge of the sub-band, and the assumed lost data symbols are shown as a hashed region ER_SYS. Accordingly, the corresponding symbols in the reproduced PRBS P_REP are marked as an excluded region EX_REG.

The correlation sum performed by the data processor 334 is represented as the combining function COMB and the adder ADD which receives the result of the combination of the wavelet coefficient with the bit from the reproduced P_REP. This correlation sum is performed for all symbols between the wavelet transform coefficients WTC and the bits of the replicated PRBS P_REP except for those symbols within the hashed regions ER_SYS and the excluded regions EX_REG. The result of each combination is added by the adder ADD thereby forming a representation of the correlation of the wavelet coefficients and the reproduced PRBS P_REP. The correlation result is presented at an output channel CORR_OUT. Thus it will be appreciated that the correlation sum according to equation (2) is adjusted accordingly.

Predetermined data sequences such as Pseudo Random Bit Sequences have an auto correlation property that when the PRBS is aligned with itself a high correlation output is produced but for any shifts of the PRBS with respect to itself a zero output or at least a low correlation output is produced. As a result by excluding the wavelet coefficients from the excluded region EX_SYS from the correlation sum the correlation output may be reduced. However this reduction may be relatively small if the PRBS is sufficiently long that the number of excluded correlation symbols does not have a significant reduction on the correlation output signal. Thus, by discounting the corresponding wavelet transform coefficients and the corresponding bits of the PRBS but otherwise maintaining the relative alignment of the symbols, the exclusion of the symbols does not have a significant effect on the performance of the correlator. As a result the entire region of the sub-band can be used for embedding data.

Further Examples

As explained above the control processor detects an amount by which the information material has shifted in accordance with which of the start positions provides a combined correlation result with the largest magnitude. Having established this shift, the control processor may be arranged in other embodiments to adapt and maintain the start position for performing subsequent correlations corresponding to this established shift, thereby avoiding the need to repeat the correlation at other start positions.

As already explained, a shift of a single wavelet coefficient of a level one wavelet transform corresponds to a shift of two pixels in the spatial domain of the image. However if the image in the spatial domain shifts by only a single pixel, there will be a reduction in the correlation output when the reproduced PRBS is correlated with the wavelet coefficients at their original position. Otherwise, the position of the wavelet coefficients to which the modulated PRBS has been added would approximately correspond with the position of the wavelet coefficients in which the modulated PRBS was originally added. However the reduction of the combined correlation signal which results may prevent the correct start position and shift value from being detected.

In order to accommodate shifts of the image in the spatial domain by a single or any odd number of pixels, the watermark decoding processor operates to generate a second version of the image frame which is pre-shifted by one pixel before being transformed into the wavelet domain. Accordingly the watermark decoder 140 shown in FIG. 9 operates to feed the watermarked image 125 for a second time to the wavelet transformer 310, after shifting the image by a single pixel value. This generation of a shifted version of the second transform domain image can be effected by the control processor 332 using feedback signals which are not shown in FIG. 10 although persons skilled in the art will understand how this may be implemented.

The second wavelet transformed image is also received on the connecting channel 315 by the frame store 331. The control processor 332 therefore forms the correlation of the reproduced PRBS with the wavelet coefficients for each version of the transform domain image, that is the image with the shift in the spatial domain and without the shift in spatial domain. As a result, the shifts in the start position corresponding to an integer number of wavelet coefficients will, for the second shifted version of the transform domain image, represent odd numbers of pixel shifts in the spatial domain, and the correlation with the un-shifted version of the image will represent even numbers of pixel shifts of the image in the spatial domain. Therefore it will be appreciated that the generation of a pre-shifted version of the image provides a facility for correlating the reproduced PRBS with all integer shifts of the image in the spatial domain and from this, the data may be recovered from the correlation output.

As will be appreciated, although the example embodiments have been described with the data added to the wavelet domain sub-band in the horizontal direction, in other embodiments the data may be added in the vertical direction. Accordingly, it will be appreciated that corresponding adjustment would be introduced to the data embedder and the correlation and control processors to the effect of combining and recovering the data in the vertical direction. This is because shifts of the image may also occur in the vertical direction, so that the start positions for the correlation may represent possible vertical shifts.

Although in the example embodiment the same PRBS has been used to represent each bit of the data to be embedded in alternative embodiments a different PRBS may be used for different bits of the data to be embedded.

Decoder According to a Second Embodiment of the Invention

FIRST EXAMPLE

Second embodiments of the present invention address a technical problem of recovering the embedded data from the wavelet coefficients if there has been a shift in the wavelet coefficients in the sub-band. As already explained such a shift can occur if the image has been processed and can occur when the image is transformed from the spatial domain to the transform domain. If the wavelet transform coefficients have shifted within the sub-band, then the PRBS will no longer be aligned with the version of the PRBS which has been added to the wavelet coefficients within the sub-band. As a result, the correlation with the reproduced PRBS will not provide a correlation output signal from which the embedded data symbols are detectable. This is addressed by embodiments of the present invention by generating a composite sequence hereinafter referred to as a correlation data sequence and correlating this with respect to the data within the sub-band. The correlation data sequence is formed as illustrated in FIG. 15, and a further example of a correlator 330' is provided in FIG. 16.

Figure 15:
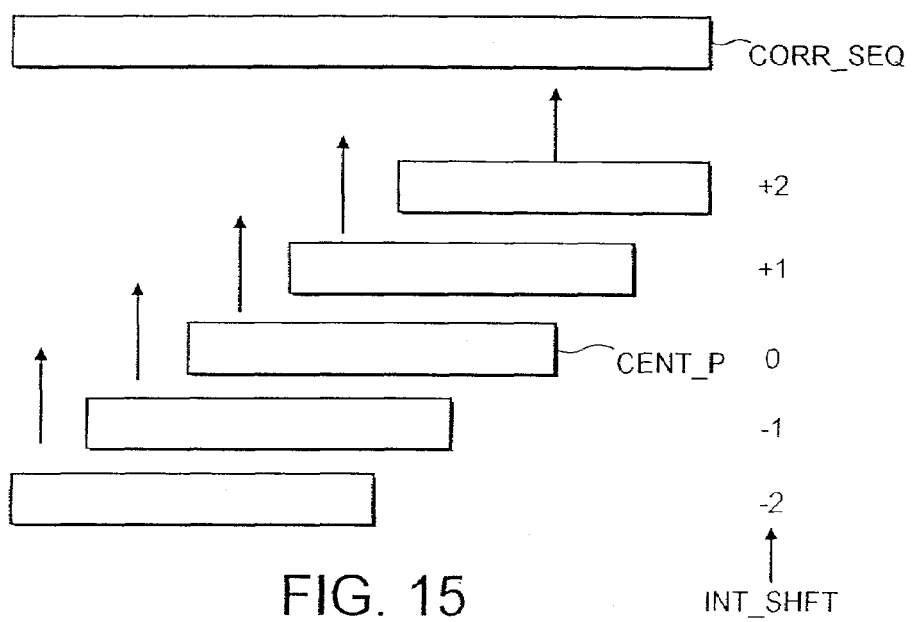
FIG. 15 is a schematic representation illustrating the formation of a correlation data sequence used by the correlator of FIG. 10.
Figure 16:
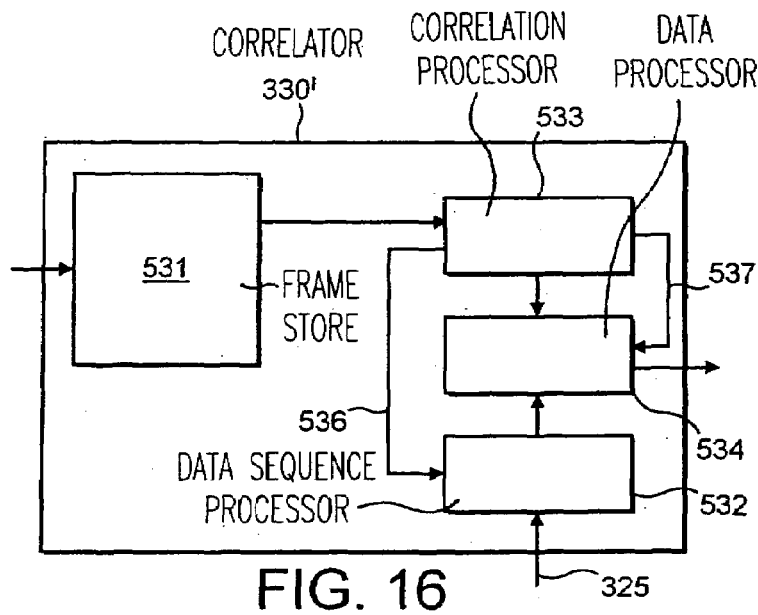
FIG. 16 is a schematic block diagram of a correlator according to an alternative embodiment of the present invention.

As illustrated in FIG. 15 a number of copies of the PRBS used to embed the data in the transform, domain are generated by the PRBS generator 520 and fed via the connecting channel 325 to the data sequence processor 532. The number of PRBS copies generated corresponds to the number of possible shifts of the data within the sub-band which can be tolerated. For each of these tolerated shifts, the embedded data may still be recovered. As illustrated in FIG. 15 the possible integer shifts INT_SHFT are shown alongside a corresponding version of the PRBS which has been shifted with respect to a central PRBS CENT_P. Effectively, therefore for the illustrative embodiment shown in FIG. 15, a shift of ±2 symbols can be tolerated and the embedded data symbols can still be detected from the output of the correlation signal. The five versions of the PRBS at each of −2, −1, 0, +1, +2 shifts are then combined together to form a composite data sequence which forms the correlation data sequence CORR_SEQ. It is the correlation data sequence CORR_SEQ which is supplied by the data sequence processor 532 to the data processor 534 under control of the correlation processor 533, which interacts with frame store 531, to generate the correlation output from which the embedded data symbols can be recovered.

Figure 17:
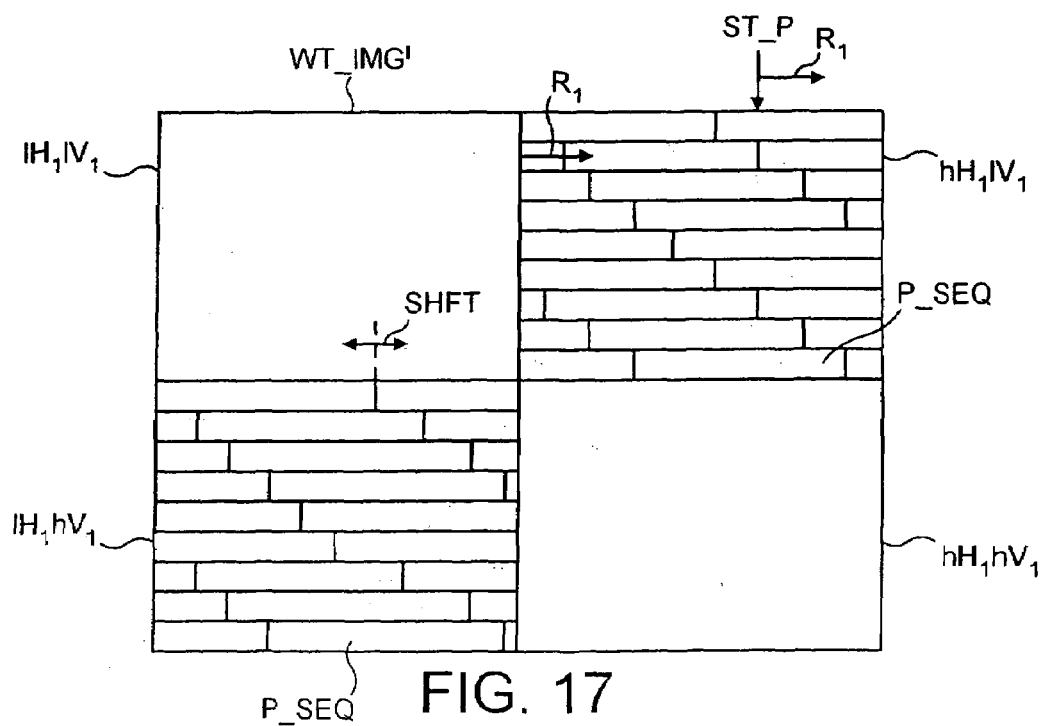
FIG. 17 provides an illustrative representation of a transform domain image from which embedded data is to be detected and recovered.
Figure 18:
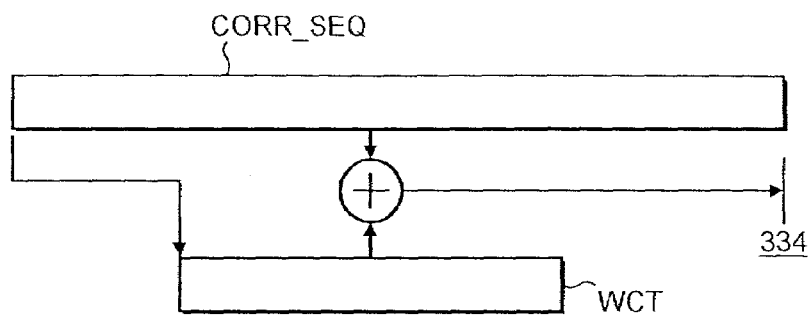
FIG. 18 is a schematic representation illustrating the operation of a data processor shown in FIG. 16 performing a correlation of the correlation data sequence of FIG. 15 and the transform domain data of FIG. 17.

In FIG. 17 the data embedded within the high horizontal, low vertical frequencies sub-band $hH_1 1V_1$ is represented as a sequence of boxes P_SEQ representing the continuous regions for which a modulated PRBS has been added to the wavelet coefficients. The correlation processor 533 is arranged to read the wavelet coefficients sequentially in correspondence with the order in which they were added to the sub-band starting with a start position ST_P from which the new PRBS is assumed to start. An arrow R1 represents the order of reading the wavelet coefficients which is performed by the correlation processor 533. The data processor 534 effectively then calculates the correlation between this set of wavelet coefficients WCT and the correlation sequence CORR_SEQ as represented schematically in FIG. 18. As a result, although the wavelet coefficients within the sub-band may have been shifted from their expected position, by up to ±2 symbols, then the wavelet coefficients recovered will nevertheless align with one of the versions of the PRBS which was used to construct the correlation data sequence CORR_SEQ. As a result the data processor 534 will generate an output correlation signal for the alignment of the wavelet coefficients with the corresponding PRBS within the correlation sequence to produce a signal from which the embedded data symbol can be detected. It is a property of data sequences such as PRBSs that other shifts of the PRBS will effectively appear as noise with respect to the aligned version of the PRBS which has been added to the wavelet coefficients. Since the correlation output will produce a high peak for the aligned PRBS, the embedded data symbol will still be detectable from the correlation output signal in spite of the presence of the other shifted versions of the PRBS, which effectively form noise.

SECOND EXAMPLE

Figure 19:
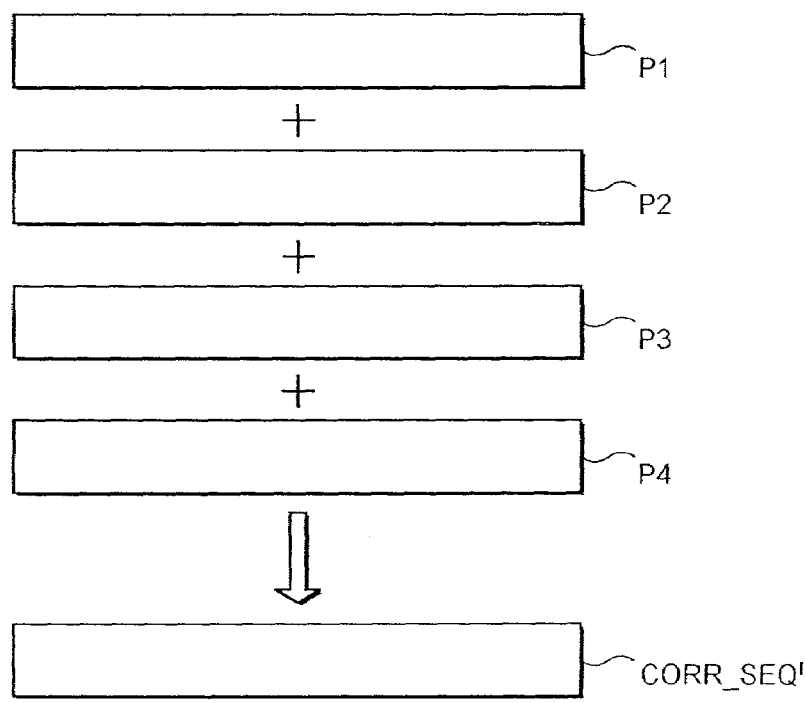
FIG. 19 is a schematic representation illustrating the formation of a further correlation data sequence which may be used by the correlator of FIG. 16.
Figure 20:
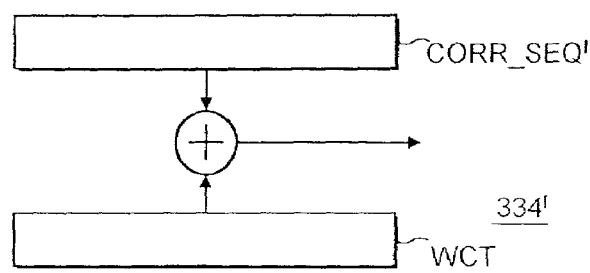
FIG. 20 is a schematic representation illustrating the operation of a data processor shown in FIG. 16 performing a cross-correlation of the correlation data sequence of FIG. 19 and the transform domain data of FIG. 17.

A further embodiment of the present invention is illustrated in FIGS. 19 and 20 respectively. The embedded data may have been combined with one of a plurality of possible PRBSs which may not be known at the watermark decoder processor 140. What would be known is that the PRBS used to embed the data is one of a limited set of PRBSs. In this example embodiment, the correlation sequence is formed by adding together the PRBSs corresponding to the set of PRBSs which could have been used to spread spectrum encode the embedded data added to the wavelet coefficients. To this end, FIG. 19 illustrates such an arrangement in which the set is considered to comprise four PRBSs P1, P2, P3, P4 which are added together to form the correlation sequence $CORR\_SEQ^1$. The correlation processor 533 then operates in exactly the same way as already explained for the first embodiment, but now correlates the recovered wavelet coefficients with the composite data sequence $CORR\_SEQ^1$ formed from combining the four different PRBSs. This is illustrated in FIG. 20. Again as with the embodiment described with reference to FIGS. 15 and 18, the PRBS which has been used to spread spectrum encode the embedded data will correlate with an aligned version of the modulated PRBS added to the wavelet coefficients. From the correlation a correlation output signal is generated from which the data processor 534 can detect the embedded data symbol. As before the other unwanted PRBSs which were not used to encode the embedded data symbols will effectively form noise to the correct PRBS. However as already explained, a property of data sequences such as PRBSs is that the correlation output for the correct PRBS, will be high enough in the presence of the other incorrect PRBSs acting as noise that the data symbol can be detectable from the resulting correlation output signal.

In preferred embodiments, the correlation processor 534 may be operable to form the correlation sequence in the embodiments described herein, by selecting a plurality of the shifted versions of the PRBS and reversing the polarity of the selected versions. By reversing the polarity of selected versions of the PRBSs to form the correlation data sequence, a reduction of the interference of the unwanted PRBSs to the wanted PRBS can be provided, when the correlation is performed. For example, alternate PRBSs of the correlation sequence can be combined with the polarity of alternate PRBSs versions reversed. Since the polarity of the PRBS which forms the wanted PRBS will be unknown as a result of the polarity inversions, a corresponding adjustment must be made in the decoder in order to interpret the recovered data correctly. This is because the embedded data recovered from the image may be inverted, in that each '0' will appear as a '1' and each '1' will appear as a '0'. In preferred embodiments, however, at least one symbol of predetermined polarity may be embedded into the image. This can be used to adjust the bit values recovered. This can be arranged in the correlator 330' itself, or after the error correction decoder. An advantage of applying correction of the recovered bits after error correction decoding is that the error correction code can be used to provide protection for the predetermined polarity symbol. Thus after decoding, the value of the predetermined polarity symbol is determined and compared with the value, which is known to the decoder. Appropriate correction can then be applied.

Other Examples

A further improvement can be provided to the embodiments described herein, to the effect of identifying which PRBS version from the plurality of PRBS versions from which the correlation sequence is formed should be used to recover the embedded data. To this end the data sequence processor 534 operates under the control of the correlation processor 533 to divide each of the versions of the PRBSs into two or more groups and to form correspondingly two or more correlation sequences by combining the respective PRBS versions of the groups. The correlation sequences are then correlated separately with the wavelet coefficients. The correlation sequence which produces a correlation output signal which exceeds the correlation threshold is identified. The identified correlation sequence therefore contains the wanted PRBS, the wanted PRBS being that which correctly corresponds with the version used to form the modulated data. This wanted PRBS can be used subsequently to recover the data by performing subsequent correlations. The PRBS versions from which the identified correlation sequence is comprised are then divided further into groups from which further correlation sequences are formed. The process is repeated to identify which of the correlation sequences contains the wanted PRBS. After further divisions, the wanted PRBS may be unambiguously identified. Correspondingly, the identified PRBS provides an indication of which of the shifted versions of the PRBS or which of the different PRBSs is present in the watermarked image. The identified PRBS can be used therefore for subsequent correlations without the interference caused by the unwanted PRBSs.

In further embodiments, a further correlation sequence could be formed by combining together a shifted version of each of the PRBSs P1, P2, P3, P4 to the effect that the number added together will correspond to the number of possible shifts of the wavelet coefficients within the sub-band. As such, this further embodiment will provide a facility for recovering the embedded data if the PRBS from a set of PRBSs is not known and if the wavelet coefficients within the sub-band have been shifted as a result of processing.

The Universal Material Identifier (UMID)

Figure 21A:
FIGS. 21A and 21B are schematic block diagrams of the structure of an extended and a basic UMID respectively.
Figure 21B:
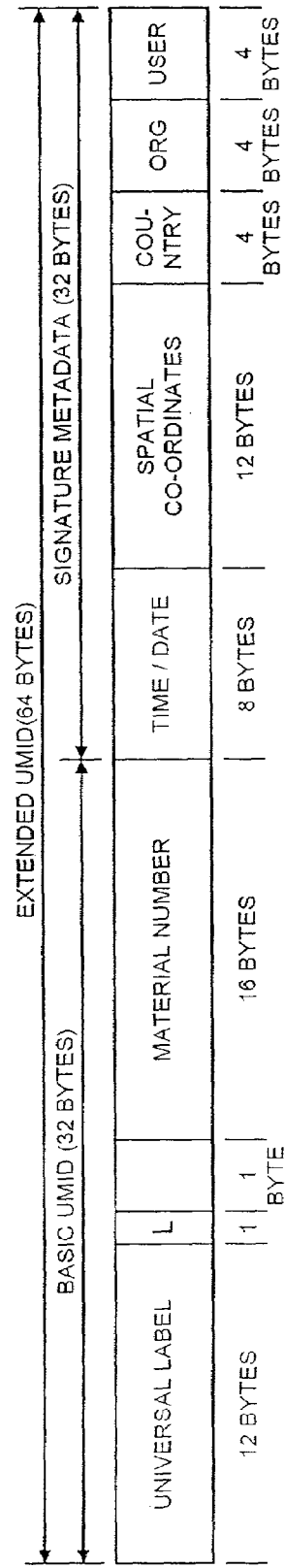

A brief explanation will now be given of the structure of the UMID, with reference to FIGS. 21A and 21B. The UMID is described in SMPTE Journal March 2000. Referring to FIG. 21A an extended UMID is shown to comprise a first set of 32 bytes of a basic UMID, shown in FIG. 21B and a second set of 32 bytes referred to as signature meta data. Thus the first set of 32 bytes of the extended UMID is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes.

More explanation of the UMID structure is provided in co-pending UK patent application number 0008432.7.

Various modifications may be made to the embodiments herein before described without departing from the scope of the present invention. Although in this example embodiment, the data to be embedded is added to the image in the transform domain, in alternative embodiments the data could be represented in the transform domain, inverse transformed into the spatial domain, and added to the data in the transform domain.

The invention claimed is:

1. An apparatus for detecting and recovering data embedded in information material, the data having been embedded in the material using a transform domain representation of at least one of said data and said information material by arranging for the data to modulate a predetermined data sequence to form modulated data and combining said modulated data with said material, the apparatus comprising:
  a transform processor operable to transform the material into a transform domain representation of said information material, and
  a correlation processor operable to correlate transform domain data symbols bearing said modulated data from said transform domain representation with a reproduced version of said predetermined data sequence to form a correlation output signal and to recover said embedded data from said correlation output signal,
  wherein said correlation processor is operable to perform said correlation of transform domain data symbols with data symbols of the predetermined data sequence, for a plurality of start positions in said transform domain, said start positions representing at least one relative possible shift of said transform domain data, and if said shift of said transform data represents a loss or corruption of transform domain data symbols, omitting corresponding symbols from said predetermined data sequence in said correlation, said lost or corrupted transform domain data symbols and said corresponding symbols of said predetermined data sequence not being included in calculating the correlation output signal.

2. An apparatus as claimed in claim 1, wherein said plurality of start positions include representations of a plurality of possible shifts of said transform domain symbols from an original position in which said modulated data was combined with said symbols.

3. An apparatus as claimed in claim 2, wherein said possible shifts correspond to shifts of an integer number of transform domain data symbols.

4. An apparatus as claimed in claim 1, comprising:
  a control processor operable to detect an amount by which said information material has shifted in accordance with which of said start positions provides a correlation output signal with the largest magnitude, said start position being subsequently used to detect and recover said embedded data in accordance with said correlation output signal.

5. An apparatus as claimed in claim 1, wherein a shift of data symbols representing said information material by a first number of information material data symbols, produces a shift by a second number of transform domain symbols of said representation of said information material in said transform domain, said apparatus comprising:
  a control processor operable to shift said information material by an amount determined in accordance with said first and second numbers to the effect that said plurality of start positions of said correlation of said predetermined data sequence with said transform domain data symbols represents a corresponding plurality of integer shifts of said information material data symbols.

6. An apparatus as claimed in claim 5, wherein said correlation at each of said plurality of start positions with said transform domain data symbols is performed with and without said shift.

7. An apparatus as claimed in claim 6, wherein said control processor is operable to detect said amount by which said information material has shifted in accordance with which of said start positions and which of said shift and not shifted version of said information material provides the correlation output signal with the highest value.

8. An apparatus as claimed in claim 5, wherein said first and second numbers are two and one respectively, said information material being shifted by one data symbol, each of said start positions in said transform domain corresponding to odd numbers of shifts of said information material data symbols.

9. An apparatus as claimed in claim 1, wherein said predetermined data sequence is a Pseudo Random Bit Sequence, said data symbols being bits.

10. An apparatus as claimed in claim 1, wherein said transform domain has a plurality of sub-bands, said modulated data being added to at least one of said sub-bands, said correlation processor being operable to correlate the transform domain data symbols from the sub-band with said predetermined data sequence except said excluded data symbols.

11. An apparatus as claimed in claim 10, wherein said lost transform domain data symbols are a predetermined number of symbols at an edge of said sub-band.

12. An apparatus as claimed in claim 1, wherein said transform is the discrete wavelet transform, said transform data symbols being wavelet coefficients, and each symbol of said modulated data being added to the wavelet coefficients.

13. An apparatus as claimed in claim 1, wherein said information material in which said data is embedded is one of video images, audio signals, video, and audio signals.

14. A computer program embodied in a computer readable medium providing computer executable instructions, which when loaded on to a data processor configures said data processor to operate as an apparatus according to claim 1.

15. A computer program embodied in a computer readable medium having recorded thereon information signals representative of the computer program claimed in claim 14.

16. An apparatus for embedding data into information material, which data can be detected and recovered by the apparatus as claimed in claim 1, said apparatus comprising:
  a combining processor operable to modulate a predetermined data sequence with said data, to form modulated data and to combine said modulated data with said material in one of a transform domain representation or an inverse transform domain representation of said material,
  wherein said combining processor is operable to form said modulated data into a transform domain representation, by introducing said data into at least one of a plurality of transform domain sub-bands, said modulated data being added to data symbols within said sub-band, including transform data symbols within extremes of said sub-band.

17. An apparatus as claimed in claim 16, wherein said at least one sub-band represents in said transform domain low spatial frequencies in one direction and high spatial frequencies in another direction.

18. An apparatus as claimed in claim 16, wherein said predetermined data sequence is a Pseudo Random Bit Sequence (PRBS), each bit of said PRBS being represented in bipolar form, said data to be embedded modulating the bits of said PRBS by reversing the sign of each bit, and said modulated Pseudo Random Bit Sequences being added to respective transform domain data symbols of said sub-band.

19. An apparatus as claimed in claim 16, wherein said transform is the Discrete Wavelet Transform, and said modulated data being added to said sub-band at each of said wavelet coefficients between the edges of said sub-band.

20. A method of detecting and recovering data embedded in information material, the data having been embedded in the material using a transform domain representation of at least one of said information material and said data by arranging for the data to modulate a predetermined data sequence to form modulated data and combining said modulated data with said material, the method comprising steps of:

forming a transform domain representation of said information material;

correlating transform domain data symbols bearing said modulated data from said transform domain representation with a reproduced version of said predetermined data sequence, to form a correlation output signal; and recovering the embedded data from said correlation output signal, wherein said correlating said predetermined data sequence with said transform domain data symbols, comprises steps of correlating transform domain data symbols and data symbols of the predetermined data sequence, repeating said correlation for at least one other start position in said transform domain, said start position representing at least one relative possible shift of said transform domain data, and if said shift of said transform domain data represents a loss or corruption of transform domain data symbols, omitting corresponding symbols from said predetermined data sequence, said lost or corrupted transform domain data symbols and said corresponding symbols of said predetermined data sequence not being included in calculating the correlation output signal.

21. A computer program embodied in a computer readable medium having computer executable instructions, which when loaded on to a data processor causes the data processor to perform the method according to claim 18.

22. An apparatus for detecting and recovering data embedded in information material, said data having been embedded in said information material by modulating a predetermined data sequence with the data to be embedded to form modulated data and combining said modulated data with said information material, said apparatus comprising:

a correlation processor operable in combination with a data sequence processor to form a correlation sequence, and a data processor operable under control of the correlation processor to correlate information material data symbols, with which said modulated data have been combined, with said correlation sequence, to form a correlation output signal representing the correlation between the information material data symbols and said correlation data sequence, and to recover said embedded data from said correlation output signal, wherein said correlation sequence comprises a plurality of predetermined data sequence versions, each of said versions being provided by shifting the predetermined data sequence used to form said modulated data with respect to others of said versions, and said correlation processor is operable in combination with said data sequence processor, to divide each of said predetermined data sequence versions into two or more groups, and to combine the predetermined data sequence version from each group to form a corresponding plurality of correlation data sequences, said data processor being arranged to correlate said information material data symbols with which said modulated data have been combined, with each of said correlation sequences, to form for each, a correlation output signal, and said correlation processor is operable to identify which of said groups of predetermined data sequence versions includes the predetermined data sequence version for recovering said embedded data symbols from the corresponding correlation output signal.

23. An apparatus as claimed in claim 22, wherein the number of said plurality of versions of said predetermined data sequences is equal to a number of possible relative shifts of the information material data symbols to which the modulated data have been added, each of said plurality of predetermined data sequences being shifted with respect to each other, and each shift representing a number of symbols by which the information material data symbols may have been shifted.

24. An apparatus as claimed in claim 22, wherein each of said predetermined data sequence versions is a different predetermined data sequence of a set of possible predetermined data sequences which may have been used to form said modulated data.

25. An apparatus as claimed in claim 22, wherein said predetermined data sequence is a Pseudo Random Bit Sequence (PRBS).

26. An apparatus as claimed in claim 25, wherein each bit of said PRBS is represented in bipolar form, said data to be embedded modulating the symbols of said PRBS by reversing the sign of each bit, and said modulated Pseudo Random Bit Sequences being combined with respective wavelet coefficients of said sub-band.

27. An apparatus as claimed in claim 22, wherein said correlation processor is operable to compare said correlation output signal with a threshold and to identify which of said groups includes the predetermined data sequence version for recovering said embedded data from the comparison.

28. An apparatus as claimed in claim 22, wherein said correlation processor is operable to divide said identified group into further groups, each of said groups being combined to form further correlation sequences and to identify which of said further groups includes said predetermined data sequence for recovering said embedded data, said dividing and said identifying being repeated until the predetermined data sequence version for recovering said embedded data is identified.

29. An apparatus as claimed in claim 22, wherein said correlation sequence is formed by selecting versions of said predetermined data sequence and reversing the polarity of said selected versions of said predetermined data sequence before combining said predetermined data sequence versions to form said correlation sequence.

30. An apparatus as claimed in claim 22, wherein said data is combined with said information material by forming a transform domain representation of said data and combining said data with said information material in either said transform domain or the inverse transform domain, said apparatus comprising:

a transform processor operable to generate a transform domain representation of said information material in which said data has been embedded, said correlation processor being operable to recover said embedded data symbols by correlating transform domain data symbols with which said embedded data has been combined with said correlation sequence.

31. An apparatus as claimed in claim 30, wherein said transform is the discrete wavelet transform, the data symbols in the transform domain being divided into each of a plurality of sub-bands comprising wavelet coefficients, and the data being added to at least one of the sub-bands.

32. An apparatus as claimed in claim 30, comprising:

a pre-processor operable to receive said information material and to generate a shifted copy of the received information material, said transform processor being operable to generate a transform domain version of said received information material and said shifted copy of said information material, and said correlation processor is operable to recover said embedded data by correlating said transform domain data of said received information material and said shifted copy of said information material.

33. An apparatus as claimed in claim 22, wherein said information material is one of audio material, video material and audio/video information material.

34. A computer program embodied in a computer readable medium for providing computer executable instructions, which when loaded on to a data processor configures said data processor to operate as an apparatus according to claim 22.

35. A computer program embodied in a computer readable medium having recorded thereon information signals representative of the computer program claimed in claim 34.

36. A method for detecting and recovering data embedded in information material, said data having been embedded in said information material by modulating a predetermined data sequence with the data to be embedded to form modulated data and combining said modulated data with said information material, said method comprising steps of:

correlating information material data symbols to which the modulated data have been added with a correlation data sequence, to form a correlation output signal representing the correlation between the information material data symbols and said correlation data sequence, and recovering said embedded data from said correlation output signal, wherein said correlation data sequence comprises a plurality of predetermined data sequence versions, each of said versions being provided by shifting the predetermined data sequence used to form said modulated data with respect to others of said versions, and the step of correlating the information material data symbols comprises dividing each of said predetermined data sequence versions into two or more groups, combining the predetermined data sequences version from each group to form a corresponding plurality of correlation data sequences, correlating said information material data symbols with which said modulated data have been combined, to form, for each, a correlation output signal, and identifying which of said groups of predetermined data sequence versions includes the predetermined data sequence version for recovering said embedded data symbols from the corresponding correlation output signal.

37. A method as claimed in claim 36, wherein each of said predetermined data sequence versions is a different predetermined data sequence of a set of possible predetermined data sequences which may have been used to form said modulated data.

38. A computer program embodied in a computer readable medium having computer executable instructions, which when loaded on to a data processor causes the data processor to perform the method according to claim 36.

39. A computer program embodied in a computer readable medium having recorded thereon information signals representative of the computer program claimed in claim 34.

40. An apparatus for detecting and recovering data embedded in information material, the data having been embedded in the material using a transform domain representation of at least one of said information material and said data by arranging for the data to modulate a predetermined data sequence to form modulated data and combining said modulated data with said material, the apparatus comprising:

means for forming a transform domain representation of said information material;

means for correlating transform domain data symbols bearing said modulated data from said transform domain representation with a reproduced version of said predetermined data sequence, to form a correlation output signal; and means for recovering the embedded data from said correlation output signal, wherein said correlating said predetermined data sequence with said transform domain data symbols, comprises means for correlating transform domain data symbols and data symbols of the predetermined data sequence, means for repeating said correlation for at least one other start position in said transform domain, said start position representing at least one relative possible shift of said transform domain data, and if said shift of said transform domain data represents a loss or corruption of transform domain data symbols, and means for omitting corresponding symbols from said predetermined data sequence, said lost or corrupted transform domain data symbols and said corresponding symbols of said predetermined data sequence not being included in calculating the correlation output signal.

41. An apparatus for detecting and recovering data embedded in information material, said data having been embedded in said information material by modulating a predetermined data sequence with the data to be embedded to form modulated data and combining said modulated data with said information material, said apparatus comprising:

means for correlating information material data symbols to which the modulated data have been added with a correlation data sequence, to form a correlation output signal representing the correlation between the information material data symbols and said correlation data sequence, and means for recovering said embedded data from said correlation output signal, wherein said correlation data sequence comprises a plurality of predetermined data sequence versions, each of said versions being provided by shifting the predetermined data sequence used to form said modulated data with respect to others of said versions, and the means for correlating the information material data symbols comprises means for dividing each of said predetermined data sequence versions into two or more groups, means for combining the predetermined data sequence version from each group to form a corresponding plurality of correlation data sequences, means for correlating said information material data symbols with which said modulated data have been combined, to form, for each, a correlation output signal, and means identifying which of said groups of predetermined data sequence versions includes the predetermined data sequence version for recovering said embedded data symbols from the corresponding correlation output signal.

\* \* \* \* \*